United States Patent
Kulkarni et al.

(10) Patent No.: US 12,401,557 B2
(45) Date of Patent: Aug. 26, 2025

(54) TECHNIQUES FOR WAVEFORM COMPRESSION

(71) Applicant: QUALCOMM Incorporated, San Diego, CA (US)

(72) Inventors: Pushkar Bajirao Kulkarni, San Diego, CA (US); Joseph Patrick Burke, San Diego, CA (US); Abdelrahman Mohamed Ahmed Mohamed Ibrahim, San Diego, CA (US); Igor Gutman, Hod HaSharon (IL); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 17/929,072

(22) Filed: Sep. 1, 2022

(65) Prior Publication Data
US 2024/0080233 A1    Mar. 7, 2024

(51) Int. Cl.
*H04L 27/26* (2006.01)
*H04L 5/00* (2006.01)
*H04L 27/34* (2006.01)

(52) U.S. Cl.
CPC ........ *H04L 27/2623* (2013.01); *H04L 5/0048* (2013.01); *H04L 27/3494* (2013.01)

(58) Field of Classification Search
CPC . H04L 27/26; H04L 5/00; H04L 27/34; H04L 25/03; H04B 1/04
See application file for complete search history.

(56) References Cited

U.S. PATENT DOCUMENTS 7,873,116 B2 * 1/2011 Okada ................. H04L 5/06
375/295
7,995,975 B2 * 8/2011 Sundstrom .......... H04L 27/2624
455/308
(Continued)

FOREIGN PATENT DOCUMENTS

CN    1695335 A  * 11/2005  ......... H04L 27/2614
CN    1702964 A  * 11/2005
(Continued)

OTHER PUBLICATIONS

Pedro F. G. da Silva et al. Design of Crest Factor Reduction Techniques Based on Clipping and Filtering for Wireless Communications Systems, IEEE 2013 (Year: 2013).*
(Continued)

*Primary Examiner* — Berhanu Tadese
(74) *Attorney, Agent, or Firm* — Holland & Hart LLP

(57) ABSTRACT

Methods, systems, and devices for wireless communications are described. A user equipment (UE) may generate an input signal including information for transmission over a wireless channel. The UE may perform a first waveform shaping stage on the input signal to increase an in-band emissions ratio and reduce a peak-to-average power ratio (PAPR) of the input signal. The UE may perform a second waveform shaping stage on the output of the first waveform shaping stage to reduce an adjacent channel leakage ratio of the output of the first waveform shaping stage. The UE may then transmit a signal over the wireless channel based on an output of the second waveform shaping stage.

30 Claims, 10 Drawing Sheets

(56) References Cited

U.S. PATENT DOCUMENTS

| | | | | |
|---|---|---|---|---|
| 8,145,251 B2* | 3/2012 | Love | H04W 52/367 | |
| | | | 455/343.1 | |
| 8,150,338 B2* | 4/2012 | Sundstrom | H04L 27/2624 | |
| | | | 455/308 | |
| 8,463,314 B2* | 6/2013 | Love | H04W 52/367 | |
| | | | 455/343.1 | |
| 8,467,463 B2* | 6/2013 | Hassler | H04L 27/2623 | |
| | | | 375/260 | |
| 8,478,328 B2* | 7/2013 | Love | H04W 52/367 | |
| | | | 455/343.1 | |
| 8,862,649 B2* | 10/2014 | Kang | H04L 27/2624 | |
| | | | 708/319 | |
| 9,231,534 B2* | 1/2016 | Rozenblit | H03F 1/0227 | |
| 9,246,523 B1* | 1/2016 | Stopler | H04B 1/0458 | |
| 9,622,190 B2* | 4/2017 | Goedken | H04W 52/367 | |
| 9,755,669 B2* | 9/2017 | Chen | H03F 3/245 | |
| 9,762,350 B2* | 9/2017 | Stopler | H04L 25/03343 | |
| 9,973,370 B1* | 5/2018 | Langer | H03F 1/3258 | |
| 10,050,817 B2* | 8/2018 | Terry | H04L 27/26265 | |
| 10,084,630 B2* | 9/2018 | Ng | H03F 3/24 | |
| 10,389,308 B2* | 8/2019 | Mao | H03F 3/21 | |
| 10,469,109 B2* | 11/2019 | Gutman | H03F 3/24 | |
| 10,491,443 B1* | 11/2019 | Khan | H04B 1/04 | |
| 10,680,870 B2* | 6/2020 | Levinbook | H04L 27/2636 | |
| 10,701,694 B2* | 6/2020 | Khan | H04W 72/0453 | |
| 10,841,136 B1* | 11/2020 | McCoy | H04L 25/03261 | |
| 11,108,609 B2* | 8/2021 | Levinbook | H04L 27/2607 | |
| 11,177,849 B2* | 11/2021 | Wang | H04B 1/401 | |
| 11,411,794 B2* | 8/2022 | Fehri | H04L 27/2615 | |
| 11,424,897 B2* | 8/2022 | Eger | H04L 27/2624 | |
| 11,444,733 B2* | 9/2022 | Levy | H04L 25/0224 | |
| 11,516,058 B2* | 11/2022 | Mukkavilli | H04W 76/27 | |
| 11,540,230 B2* | 12/2022 | Maleki | H04L 27/2624 | |
| 11,563,614 B2* | 1/2023 | Yunusov | H04L 27/2615 | |
| 11,677,603 B2* | 6/2023 | Sahraei | H04L 27/2614 | |
| | | | 370/329 | |
| 11,683,706 B2* | 6/2023 | Barak | H04L 5/0048 | |
| | | | 370/252 | |
| 11,689,343 B2* | 6/2023 | Eger | H04L 5/023 | |
| | | | 370/330 | |
| 11,700,023 B2* | 7/2023 | Upadhya | H04B 1/0475 | |
| | | | 375/296 | |
| 11,711,120 B1* | 7/2023 | Sverdlov | H04B 7/0639 | |
| | | | 375/262 | |
| 11,729,038 B2* | 8/2023 | Zach | H04L 27/2623 | |
| | | | 370/328 | |
| 11,777,777 B2* | 10/2023 | Ly | H04W 72/044 | |
| | | | 370/329 | |
| 11,855,594 B2* | 12/2023 | Kojima | H04W 52/00 | |
| 11,888,670 B1* | 1/2024 | Meir | H04B 1/0475 | |
| 11,997,036 B2* | 5/2024 | Levy | H04W 72/541 | |
| 12,057,985 B2* | 8/2024 | Sakhnini | H04L 27/2697 | |
| 12,063,600 B2* | 8/2024 | Gutman | H04W 52/241 | |
| 12,137,017 B2* | 11/2024 | Zhang | H04L 27/2613 | |
| 12,143,082 B2* | 11/2024 | Gutman | H03G 3/3089 | |
| 2007/0173260 A1* | 7/2007 | Love | H04W 72/541 | |
| | | | 455/450 | |
| 2007/0173276 A1* | 7/2007 | Love | H04W 52/367 | |
| | | | 455/522 | |
| 2008/0025254 A1* | 1/2008 | Love | H04W 52/242 | |
| | | | 370/329 | |
| 2012/0114073 A1* | 5/2012 | Beek | H04L 25/03834 | |
| | | | 375/296 | |
| 2012/0172080 A1* | 7/2012 | Love | H04W 52/367 | |
| | | | 455/522 | |
| 2012/0172081 A1* | 7/2012 | Love | H04W 52/367 | |
| | | | 455/522 | |
| 2012/0219086 A1* | 8/2012 | Beek | H04L 27/2634 | |
| | | | 375/295 | |
| 2013/0016765 A1* | 1/2013 | Park | H04L 27/2626 | |
| | | | 375/295 | |
| 2013/0165132 A1* | 6/2013 | Goedken | H04W 52/243 | |
| | | | 455/450 | |
| 2016/0241359 A1* | 8/2016 | Stopler | H04L 27/26265 | |
| 2019/0268202 A1* | 8/2019 | Levinbook | H04L 27/2614 | |
| 2020/0068570 A1* | 2/2020 | Khan | H04B 1/0475 | |
| 2020/0204421 A1* | 6/2020 | Levinbook | H04L 27/2607 | |
| 2021/0099197 A1* | 4/2021 | Wang | H04B 1/401 | |
| 2021/0144657 A1* | 5/2021 | Ang | H04W 52/0261 | |
| 2021/0176107 A1* | 6/2021 | Hou | H03F 1/3241 | |
| 2021/0288854 A1* | 9/2021 | Mukkavilli | H04L 27/2618 | |
| 2021/0328751 A1* | 10/2021 | Eger | H04L 27/2614 | |
| 2022/0038322 A1* | 2/2022 | Ly | H04L 27/2614 | |
| 2022/0255688 A1* | 8/2022 | Radulescu | H04L 27/2601 | |
| 2022/0385515 A1* | 12/2022 | Kutz | H04L 27/2623 | |
| 2022/0393709 A1* | 12/2022 | Kutz | H03F 3/24 | |
| 2023/0091116 A1* | 3/2023 | Kutz | H03F 1/32 | |
| | | | 370/329 | |
| 2023/0133797 A1* | 5/2023 | Jiang | H04L 27/2623 | |
| | | | 370/330 | |
| 2023/0155617 A1* | 5/2023 | Meir | H04L 25/0224 | |
| | | | 370/329 | |
| 2023/0291630 A1* | 9/2023 | Hosseini | H04L 27/2646 | |
| 2023/0318636 A1* | 10/2023 | Kulkarni | H03F 3/213 | |
| | | | 455/552.1 | |
| 2023/0389005 A1* | 11/2023 | Zhang | H04W 72/1263 | |
| 2024/0007971 A1* | 1/2024 | Saggar | H04W 52/36 | |
| 2024/0014991 A1* | 1/2024 | Paz | H04L 5/0048 | |
| 2024/0040506 A1* | 2/2024 | Uziel | H04W 52/0229 | |
| 2024/0080233 A1* | 3/2024 | Kulkarni | H04L 5/0048 | |
| 2024/0088848 A1* | 3/2024 | Kojima | H03F 3/245 | |
| 2024/0121715 A1* | 4/2024 | Abotabl | H04W 52/0274 | |
| 2024/0187290 A1* | 6/2024 | Oved | H04B 1/12 | |
| 2024/0357395 A1* | 10/2024 | Shaked | H04L 5/0051 | |

FOREIGN PATENT DOCUMENTS

| | | | | |
|---|---|---|---|---|
| CN | 1972179 A | * | 5/2007 | |
| CN | 1972263 A | * | 5/2007 | |
| CN | 1972264 A | * | 5/2007 | |
| CN | 2907089 Y | * | 5/2007 | |
| CN | 2907090 Y | * | 5/2007 | |
| CN | 101048950 A | * | 10/2007 | |
| CN | 101136890 A | * | 3/2008 | |
| CN | 101257481 A | * | 9/2008 | |
| CN | 101483627 A | * | 7/2009 | |
| CN | 100550627 C | * | 10/2009 | |
| CN | 100555891 C | * | 10/2009 | |
| CN | 101601247 A | * | 12/2009 | H04L 27/2618 |
| CN | 101645862 A | * | 2/2010 | |
| CN | 101702698 A | * | 5/2010 | H04L 5/06 |
| CN | 101986636 A | * | 3/2011 | H04B 1/713 |
| CN | 101399792 B | * | 5/2011 | |
| CN | 101483627 B | * | 5/2011 | |
| CN | 1695335 B | * | 6/2011 | H04L 27/2614 |
| CN | 102223338 A | * | 10/2011 | |
| CN | 101257481 B | * | 9/2012 | |
| CN | 101601247 B | * | 1/2013 | H04L 27/2618 |
| CN | 101702698 B | * | 1/2013 | H04L 5/06 |
| CN | 103188199 A | * | 7/2013 | |
| CN | 102223338 B | * | 10/2013 | |
| CN | 101645862 B | * | 11/2013 | |
| CN | 101986636 B | * | 7/2014 | H04B 1/713 |
| CN | 104751209 A | * | 7/2015 | |
| CN | 104751209 B | * | 2/2018 | |
| CN | 108462559 A | * | 8/2018 | |
| CN | 109952748 A | * | 6/2019 | G06F 17/141 |
| CN | 110945846 A | * | 3/2020 | H04B 1/02 |
| CN | 109952748 B | * | 11/2020 | G06F 17/141 |
| CN | 110945846 B | * | 9/2021 | H04B 1/02 |
| CN | 114189411 A | * | 3/2022 | H04B 1/0064 |
| CN | 115244905 A | * | 10/2022 | |
| CN | 116158127 A | * | 5/2023 | |
| DE | 102021106637 A1 | * | 11/2021 | H04L 1/0003 |
| DE | 102021106637 A9 | * | 11/2021 | H04L 1/0003 |
| EP | 1924044 A1 | * | 5/2008 | H04L 27/2618 |
| EP | 2536046 A1 | * | 12/2012 | |
| EP | 2406904 B1 | * | 9/2013 | H04L 25/03834 |
| EP | 2654226 A2 | * | 10/2013 | H04L 25/03834 |
| EP | 2103067 B1 | * | 5/2018 | H04L 27/2624 |
| EP | 2050200 B1 | * | 11/2018 | H04W 52/242 |

(56) References Cited

FOREIGN PATENT DOCUMENTS

| | | | | |
|---|---|---|---|---|
| EP | 1982434 B1 * | 7/2019 | ......... | H04W 52/367 |
| EP | 2654226 B1 * | 9/2019 | ....... | H04L 25/03834 |
| EP | 3529957 B1 * | 9/2021 | | |
| EP | 3968526 A1 * | 3/2022 | ........... | H04B 1/0064 |
| JP | 2009164754 A * | 7/2009 | ........... | H04L 1/0026 |
| JP | 4558741 B2 * | 10/2010 | ............... | H04L 5/06 |
| JP | 2012182840 A * | 9/2012 | ........... | H04L 1/0026 |
| JP | 5061892 B2 * | 10/2012 | ........... | H04L 1/0026 |
| JP | 5122564 B2 * | 1/2013 | ......... | H04W 52/242 |
| JP | 5415959 B2 * | 2/2014 | ........ | H04L 27/2624 |
| JP | 5445624 B2 * | 3/2014 | ........... | H04L 1/0026 |
| KR | 20240095185 A | 6/2024 | | |
| WO | WO-0309373 * | 1/2002 | ............. | H04L 25/00 |
| WO | WO-2006049140 A1 * | 5/2006 | | |
| WO | WO-2007087482 A2 * | 8/2007 | ......... | H04W 52/242 |
| WO | WO-2007087483 A2 * | 8/2007 | ......... | H04W 52/367 |
| WO | WO-2008014118 A2 * | 1/2008 | ......... | H04W 52/242 |
| WO | WO-2008058840 A1 * | 5/2008 | ......... | H04L 27/2618 |
| WO | WO-2008074801 A1 * | 6/2008 | ......... | H04L 27/2624 |
| WO | WO-2011009239 A1 * | 1/2011 | ....... | H04L 25/03834 |
| WO | WO-2012065451 A1 * | 5/2012 | ............. | H04B 1/713 |
| WO | WO-2013185698 A1 * | 12/2013 | ......... | H04L 27/0008 |
| WO | WO-2014088792 A1 * | 6/2014 | ............ | H04W 52/146 |
| WO | WO-2016042400 A2 * | 3/2016 | ............. | H04B 1/0458 |
| WO | WO-2018098692 A1 * | 6/2018 | | |
| WO | WO-2019042532 A1 * | 3/2019 | | |
| WO | WO-2019117888 A1 * | 6/2019 | | |
| WO | WO-2020040815 A1 * | 2/2020 | | |
| WO | WO-2020188316 A1 * | 9/2020 | ............... | G06N 3/04 |
| WO | WO-2021096800 A1 * | 5/2021 | ............. | H04B 1/401 |
| WO | WO-2021183981 A1 * | 9/2021 | | |
| WO | WO-2021211461 A1 * | 10/2021 | ......... | H04L 27/2614 |
| WO | WO-2021222345 A1 * | 11/2021 | ......... | H04L 27/2614 |
| WO | WO-2022027054 A1 * | 2/2022 | ......... | H04L 27/2614 |
| WO | WO-2022199793 A1 * | 9/2022 | ......... | H04L 27/2601 |
| WO | WO-2022240740 A1 * | 11/2022 | | |
| WO | WO-2013009522 A1 * | 3/2023 | ............. | H04L 25/03 |
| WO | WO-2023025397 A1 * | 3/2023 | ....... | H04L 27/26412 |
| WO | WO-2023075979 A1 * | 5/2023 | ......... | H04L 27/2614 |
| WO | WO-2023225442 A1 * | 11/2023 | ............. | H04L 1/0007 |
| WO | WO-2024005710 A1 * | 1/2024 | ........ | H04L 25/03834 |
| WO | WO-2024006602 A1 * | 1/2024 | ........ | H04L 27/2607 |
| WO | WO-2024006610 | 1/2024 | | |
| WO | WO-2024006610 A1 * | 1/2024 | | |

OTHER PUBLICATIONS

An Iterative Method to Restore the Performance of Clipped and Filtered OFDM Signals, by Chen et al. IEEE 2003 (Year: 2003).*

Crest Factor Reduction Techniques Based on Clipping and Filtering for Wireless Communications Systems, by Pedro F. G. et al., IEEE 2013 (Year: 2013).*

Iterative Clipping and Filtering Technique for PAPR Reduction of OFDM Signals, by Abouty et al., Feb. 2013 (Year: 2013).*

J. Armstrong, Peak-to-average power reduction for OFDM by repeated clipping and frequency domain filtering, Electronics Letters, vol. 38, No. 5, Feb. 2002 (Year: 2002).*

Sperlich et al. Power_amplifier_linearization_with_digital_pre-distortion_and_crest_factor_reduction, IEEE 2004 (Year: 2004).*

* cited by examiner

TECHNIQUES FOR WAVEFORM COMPRESSION

FIELD OF TECHNOLOGY

The following relates to wireless communications, including improved techniques for waveform compression.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support wireless communications between network devices. For example, a UE may transmit uplink signaling to a network entity. In some cases, a signal between network devices may be referred to as a waveform. Network devices may perform operations to shape waveforms, which may include compression operations or other signal processing operations. In some cases, waveform shaping operations may reduce signal noise or intermodulation distortion (IMD) associated with the signal. Some wireless devices may include power amplifiers (PAs) for amplifying signals. A range (e.g., a transmission distance) of a signal may be based on a level of amplification at a PA. However, in some cases, increasing an output of a PA may result in undesirable waveform properties.

SUMMARY

The described techniques relate to improved methods, systems, devices, and apparatuses that support improved techniques for waveform compression. For example, the described techniques provide for a network device (e.g., a user equipment (UE) or a network entity) to increase a range of a signal while increasing an in-band emissions (IBE) ratio for the signal, reducing a peak-to-average power ratio (PAPR) for the signal, and reducing an adjacent channel leakage ratio (ACLR) of the signal. The network device may perform a first waveform shaping stage, including an interference cancelling operation and a clipping operation, and a second stage including a frequency selective filtering operation. In some cases, one or both waveform shaping stages may be performed iteratively (e.g., for a quantity of iterations).

A method for wireless communications at a user equipment (UE) is described. The method may include generating an input signal including information for transmission over a wireless channel, performing a first waveform shaping stage of a multistage waveform shaping process on the input signal, where performing the first waveform shaping stage includes increasing an in-band emissions ratio of the input signal and reducing a peak-to-average-power ratio (PAPR) of the input signal, performing a second waveform shaping stage of the multistage waveform shaping process on an output of the first waveform shaping stage, where performing the second waveform shaping stage includes reducing an adjacent channel leakage ratio of the output of the first waveform shaping stage, and transmitting a signal over the wireless channel, where the signal is based on an output of the second waveform shaping stage.

An apparatus for wireless communications at a UE is described. The apparatus may include a processor, memory coupled with the processor, and instructions stored in the memory. The instructions may be executable by the processor to cause the apparatus to generate an input signal including information for transmission over a wireless channel, perform a first waveform shaping stage of a multistage waveform shaping process on the input signal, where performing the first waveform shaping stage includes increasing an in-band emissions ratio of the input signal and reducing a peak-to-average-power ratio (PAPR) of the input signal, perform a second waveform shaping stage of the multistage waveform shaping process on an output of the first waveform shaping stage, where performing the second waveform shaping stage includes reducing an adjacent channel leakage ratio of the output of the first waveform shaping stage, and transmit a signal over the wireless channel, where the signal is based on an output of the second waveform shaping stage.

Another apparatus for wireless communications at a UE is described. The apparatus may include means for generating an input signal including information for transmission over a wireless channel, means for performing a first waveform shaping stage of a multistage waveform shaping process on the input signal, where performing the first waveform shaping stage includes increasing an in-band emissions ratio of the input signal and reducing a peak-to-average-power ratio (PAPR) of the input signal, means for performing a second waveform shaping stage of the multistage waveform shaping process on an output of the first waveform shaping stage, where performing the second waveform shaping stage includes reducing an adjacent channel leakage ratio of the output of the first waveform shaping stage, and means for transmitting a signal over the wireless channel, where the signal is based on an output of the second waveform shaping stage.

A non-transitory computer-readable medium storing code for wireless communications at a UE is described. The code may include instructions executable by a processor to generate an input signal including information for transmission over a wireless channel, perform a first waveform shaping stage of a multistage waveform shaping process on the input signal, where performing the first waveform shaping stage includes increasing an in-band emissions ratio of the input signal and reducing a peak-to-average-power ratio (PAPR) of the input signal, perform a second waveform shaping stage of the multistage waveform shaping process on an output of the first waveform shaping stage, where performing the second waveform shaping stage includes reducing an adjacent channel leakage ratio of the output of the first waveform shaping stage, and transmit a signal over the wireless channel, where the signal is based on an output of the second waveform shaping stage.

In some examples of the method, apparatuses, and non-transitory computer-readable medium described herein, performing the first waveform shaping stage of the multistage waveform shaping process may include operations, features, means, or instructions for performing an interference cancellation operation to increase the in-band emissions ratio of the input signal.

In some examples of the method, apparatuses, and non-transitory computer-readable medium described herein, performing the interference cancellation operation may include operations, features, means, or instructions for performing a state expansion of nonlinear components of the input signal and performing frequency selective filtering on an output of the state expansion.

In some examples of the method, apparatuses, and non-transitory computer-readable medium described herein, performing the interference cancellation operation may include operations, features, means, or instructions for performing a clipping operation on the input signal and performing frequency selective filtering on an output of the clipping operation.

In some examples of the method, apparatuses, and non-transitory computer-readable medium described herein, performing the first waveform shaping stage of the multistage waveform shaping process may include operations, features, means, or instructions for performing a clipping operation after increasing the in-band emissions ratio of the input signal to reduce the PAPR of the input signal.

In some examples of the method, apparatuses, and non-transitory computer-readable medium described herein, performing the clipping operation may include operations, features, means, or instructions for performing a quantity of iterations of the clipping operation, where the output of the first waveform shaping stage includes an output of a final iteration of the quantity of iterations of the clipping operation.

In some examples of the method, apparatuses, and non-transitory computer-readable medium described herein, performing the second waveform shaping stage of the multistage waveform shaping process may include operations, features, means, or instructions for performing frequency selective filtering on the output of the first waveform shaping stage to reduce the adjacent channel leakage ratio of the output of the first waveform shaping stage.

In some examples of the method, apparatuses, and non-transitory computer-readable medium described herein, an in-band emissions ratio of the output of the second waveform shaping stage may be greater than the in-band emissions ratio of the input signal.

In some examples of the method, apparatuses, and non-transitory computer-readable medium described herein, an adjacent channel leakage ratio of the output of the second waveform shaping stage may be greater than an adjacent channel leakage ratio of the input signal.

In some examples of the method, apparatuses, and non-transitory computer-readable medium described herein, performing the first waveform shaping stage may include operations, features, means, or instructions for introducing intermodulation distortion to the output of the first waveform shaping stage for processing at a receiver.

In some examples of the method, apparatuses, and non-transitory computer-readable medium described herein, performing the first waveform shaping stage may include operations, features, means, or instructions for reducing an adjacent channel leakage ratio of the input signal.

In some examples of the method, apparatuses, and non-transitory computer-readable medium described herein, performing the first waveform shaping stage may include operations, features, means, or instructions for performing a quantity of iterations of the first waveform shaping stage, where the output of the first waveform shaping stage includes an output of a final iteration of the quantity of iterations of the first waveform shaping stage.

A method for wireless communication at a UE is described. The method may include generating an input signal including information for transmission over a wireless channel, performing a first waveform shaping stage of a multistage waveform shaping process on the input signal, where performing the first waveform shaping stage includes increasing an in-band emissions ratio of the input signal and reducing a peak-to-average-power ratio (PAPR) of the input signal, performing a second waveform shaping stage of the multistage waveform shaping process on an output of the first waveform shaping stage, where performing the second waveform shaping stage includes reducing an adjacent channel leakage ratio of the output of the first waveform shaping stage, and transmitting a signal over the wireless channel, where the signal is based on an output of the second waveform shaping stage.

An apparatus for wireless communication at a UE is described. The apparatus may include a processor, memory coupled with the processor, and instructions stored in the memory. The instructions may be executable by the processor to cause the apparatus to generate an input signal including information for transmission over a wireless channel, perform a first waveform shaping stage of a multistage waveform shaping process on the input signal, where performing the first waveform shaping stage includes increasing an in-band emissions ratio of the input signal and reducing a peak-to-average-power ratio (PAPR) of the input signal, perform a second waveform shaping stage of the multistage waveform shaping process on an output of the first waveform shaping stage, where performing the second waveform shaping stage includes reducing an adjacent channel leakage ratio of the output of the first waveform shaping stage, and transmit a signal over the wireless channel, where the signal is based on an output of the second waveform shaping stage.

Another apparatus for wireless communication at a UE is described. The apparatus may include means for generating an input signal including information for transmission over a wireless channel, means for performing a first waveform shaping stage of a multistage waveform shaping process on the input signal, where performing the first waveform shaping stage includes increasing an in-band emissions ratio of the input signal and reducing a peak-to-average-power ratio (PAPR) of the input signal, means for performing a second waveform shaping stage of the multistage waveform shaping process on an output of the first waveform shaping stage, where performing the second waveform shaping stage includes reducing an adjacent channel leakage ratio of the output of the first waveform shaping stage, and means for transmitting a signal over the wireless channel, where the signal is based on an output of the second waveform shaping stage.

A non-transitory computer-readable medium storing code for wireless communication at a UE is described. The code may include instructions executable by a processor to generate an input signal including information for transmission over a wireless channel, perform a first waveform shaping stage of a multistage waveform shaping process on the input signal, where performing the first waveform shaping stage includes increasing an in-band emissions ratio of the input signal and reducing a peak-to-average-power ratio (PAPR) of the input signal, perform a second waveform shaping stage of the multistage waveform shaping process on an output of the first waveform shaping stage, where performing the second waveform shaping stage includes reducing an adjacent channel leakage ratio of the output of the first waveform shaping stage, and transmit a signal over the wireless channel, where the signal is based on an output of the second waveform shaping stage.

Some examples of the method, apparatuses, and non-transitory computer-readable medium described herein may further include operations, features, means, or instructions for perform an interference cancellation operation to increase the in-band emissions ratio of the input signal.

Some examples of the method, apparatuses, and non-transitory computer-readable medium described herein may further include operations, features, means, or instructions for perform a state expansion of nonlinear components of the input signal and perform frequency selective filtering on an output of the state expansion.

Some examples of the method, apparatuses, and non-transitory computer-readable medium described herein may further include operations, features, means, or instructions for perform a clipping operation on the input signal and perform frequency selective filtering on an output of the clipping operation.

Some examples of the method, apparatuses, and non-transitory computer-readable medium described herein may further include operations, features, means, or instructions for perform a clipping operation after increasing the in-band emissions ratio of the input signal to reduce the PAPR of the input signal.

Some examples of the method, apparatuses, and non-transitory computer-readable medium described herein may further include operations, features, means, or instructions for perform a quantity of iterations of the clipping operation, where the output of the first waveform shaping stage includes an output of a final iteration of the quantity of iterations of the clipping operation.

DETAILED DESCRIPTION

A wireless communications system may support wireless communications between network devices. For example, a user equipment (UE) may transmit uplink signaling to a network entity. In some cases, a signal, such as an uplink signal transmitted by the UE, may be referred to as a waveform. The term "waveform" may refer to a shape of the signal taken with respect to time (e.g., an amplitude of the signal with respect to time). In some cases, it may be desirable to increase a range (e.g., transmission distance) of a signal, however, some techniques for increasing the range of the signal may result in undesirable waveform properties. For example, a UE may increase a power output or a gain for a signal, however, as a result of increasing the power output or the gain, a peak-to-average power ratio (PAPR), an adjacent channel leakage ratio (ACLR), an in-band emissions (IBE) ratio, or any combination thereof for the waveform may be negatively affected.

In accordance with aspects of the present disclosure, a network device may perform one or more operations to increase a range of a signal (e.g., a transmitted waveform) without negatively affecting a PAPR, ACLR and IBE for the signal. In some cases, the waveform may include intermodulation distortion (IMD), however, a receiver may be configured to process (e.g., decode) the waveform with IMD. In some cases, the one or more operations performed by the network device may include a first stage and a second stage. The first stage may include performing an interference cancelling operation to increase an IBE ratio of the waveform and performing a clipping operation to reduce a PAPR of the waveform. The second stage may include performing a frequency selective filtering operation to reduce an ACLR of the waveform. As a result of performing the operations for the first stage and the second stage, a range of the waveform may be increased.

Figure 1:
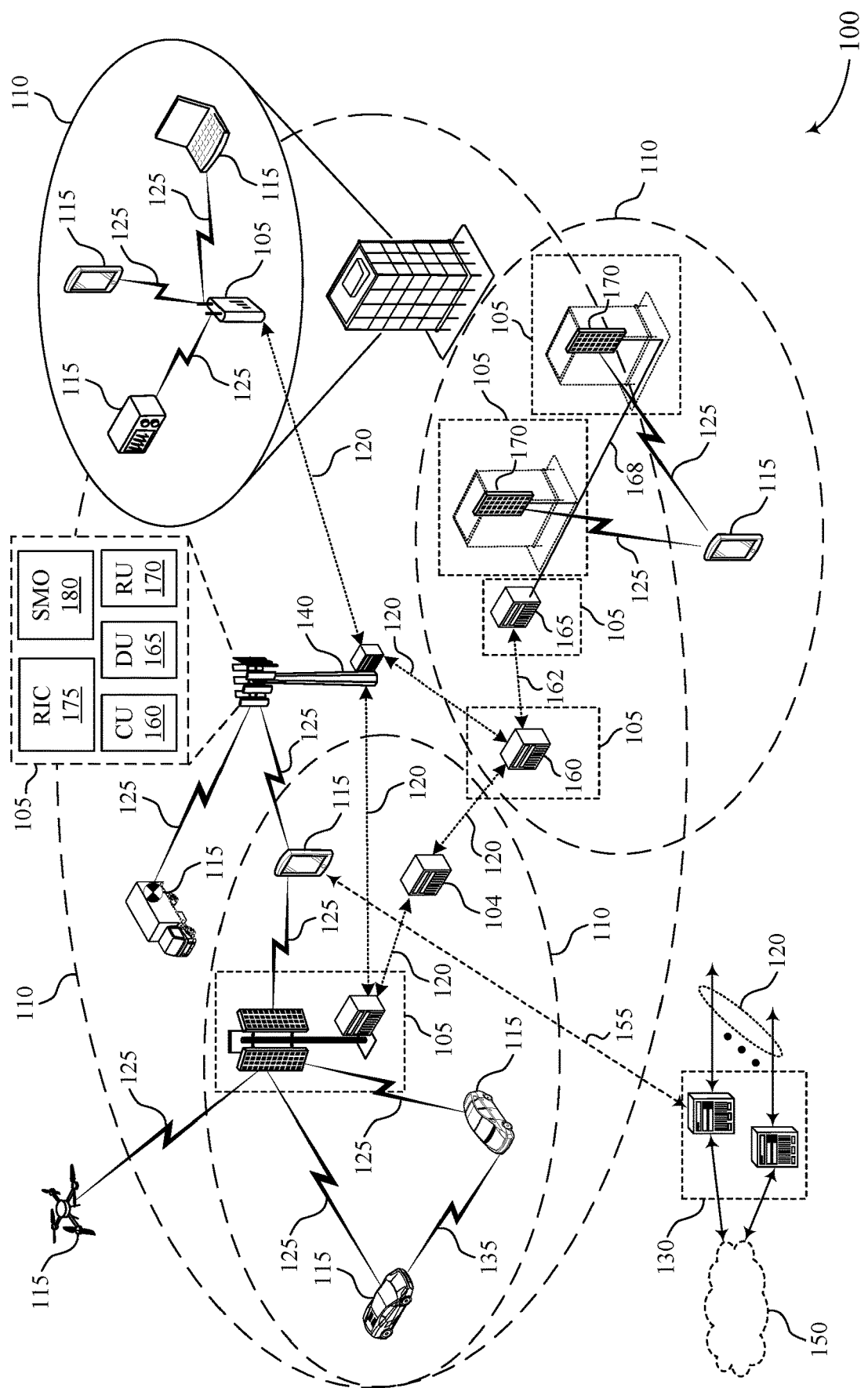
FIG. 1 illustrates an example of a wireless communications system that supports improved techniques for waveform compression in accordance with one or more aspects of the present disclosure.

Aspects of the disclosure are initially described in the context of wireless communications system with reference to FIG. 1. Features of the disclosure are described in the context of systems and subsystems with reference to FIGS. 2A through 4. Aspects of the disclosure are further illustrated by and described with reference to apparatus diagrams, system diagrams, and flowcharts that relate to improved techniques for waveform compression with reference to FIGS. 5 through 10.

FIG. 1 illustrates an example of a wireless communications system 100 that supports improved techniques for waveform compression in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support improved techniques for waveform compression as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_S=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

As described herein, the UE 115, the network entity 105, or both, may be configured for high data rate communications. For example, the UE 115 may modulate waveforms for wireless communications using quadrature amplitude modulation (QAM), which may have a higher data rate than quadrature phase shift keying (QPSK) modulation. In some cases, for high data rate communications, a network device (e.g., the UE 115, the network entity 105, or both) may reduce a gain of a PA to improve signal quality. However, reducing the gain of the PA may reduce a range of the signal.

In accordance with aspects of the present disclosure, a UE 115, a network entity 105, or both may perform waveform shaping operations to increase a quality of a signal. For example, the UE 115 may perform the waveform shaping operations to mitigate negative effects of increasing PA output and meet performance targets for the signal. The waveform shaping operations may include a clipping operation to reduce a PAPR of a waveform, an interference cancelling operation to increase an IBE ratio of the waveform, and an ACLR correction operation to increase ACLR of the waveform. Accordingly, the range of the signal may be increased without reducing a quality of the signal.

Figure 2A:
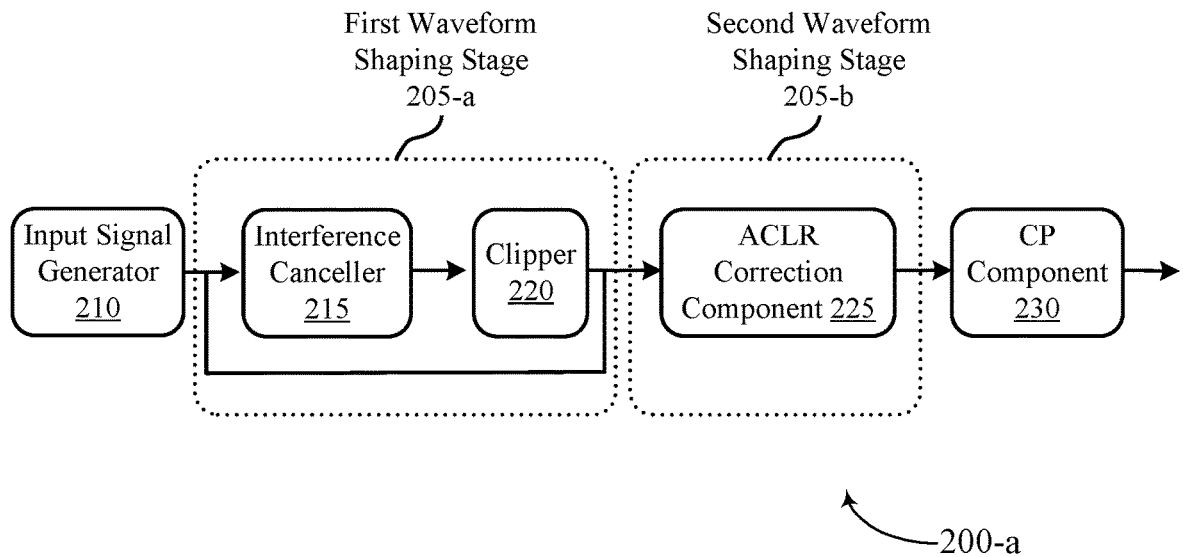
FIGS. 2A and 2B illustrate examples of systems that support improved techniques for waveform compression in accordance with one or more aspects of the present disclosure.

FIG. 2A illustrates an example of a system 200-a that supports improved techniques for waveform compression in accordance with one or more aspects of the present disclosure. The system 200-a may be implemented by aspects of the wireless communications system 100. For example, the system 200-a may be implemented by a UE 115 or a network entity 105, as described with reference to FIG. 1. The system 200-a may include one or more components (e.g., hardware components) installed at a UE 115 or a network entity 105 for processing wireless communications signals. For example, the system 200-a may include an input signal generator 210, an interference canceller 215, a clipper 220, an ACLR correction component 225, and a cyclic prefix (CP) component 230. These components may be implemented as, for example, a first waveform shaping stage 205-a and a second waveform shaping stage 205-b. In some cases, the first waveform shaping stage 205-a may be performed prior to the second waveform shaping stage 205-b.

In some cases, a signal may be amplified using a power amplifier (PA). For example, a UE 115 may amplify a signal for wireless communications using a PA. The PA may have an efficiency, which may be referred to as power-added efficiency (PAE). In some cases, the input signal generator 210 may include one or more PAs, which may amplify a signal. In some other cases, a signal may be amplified by a PA that is not included in the input signal generator 210. For example, the first waveform shaping stage 205-a, the second waveform shaping stage 205-b, or both, may include one or more PAs. Additionally or alternatively, a UE 115 may utilize one or more PAs to amplify an output of the CP component 230. In some cases, a range of the signal may be based on a configuration (e.g., a setting, a parameter) of the PA. For example, increasing a gain of a PA may increase a range of a signal output by the PA. Additionally or alternatively, operation of a PA may be based on a maximum power reduction (MPR), which may be a setting or a parameter of a PA. The MPR may specify an extent to which an output of a PA is reduced (e.g., a reduction of a maximum power level). In some cases, increasing an MPR for a PA may reduce a range of a signal output by the PA.

Amplifying a signal (e.g., via a PA) without performing a multi-stage waveform shaping process may negatively impact one or more signal quality metrics (e.g., non-linearity of the signal may be increased, intermodulation distortion (IMD) of the signal may be increased). For example, amplifying a signal may reduce signal quality if the signal is not effectively compressed. In some cases, amplifying a signal may increase a PAPR, decrease an IBE ratio, decrease an ACLR, and decrease an error vector magnitude (EVM) for the signal. In some cases, amplifying the signal may degrade signal quality to the extent that a receiver (e.g., a network entity 105) may be unable to decode the signal. For example, a network entity may not be configured to receive or process non-linear signaling. Accordingly, an output of a PA may be reduced to increase signal quality at a transmitter (e.g., increasing MPR may reduce signal power and may increase signal quality). For example, a UE 115 may reduce a gain for a PA to improve signal quality. However, reducing an output of a PA may reduce a range of the signal, which may be undesirable.

In some cases, a network device (e.g., a UE 115 or a network entity 105) may modulate a signal according to a modulation scheme. In some cases, a data rate for a wireless communications signal may be based on a modulation scheme. For example, a UE 115 may modulate a signal using QPSK, QAM, or any other modulation scheme. In some cases, a data rate for QAM may be higher than a data rate for QPSK. In some cases, a network device may determine a modulation scheme based on operating conditions. For example, if operating conditions are relatively favorable, a UE 115 may determine to use a modulation scheme associated with a relatively high data rate. In some cases, a UE 115 may be unable to communicate high data rate signaling if an SNR is not sufficiently high. Accordingly, for modulation schemes associated with high data rates (e.g., 256QAM), a network device may reduce an output of a PA (e.g., increase MPR) to increase signal quality. However, reducing the output of the PA may decrease the range of the signal.

In accordance with aspects of the present disclosure a network device (e.g., a UE 115 or a network entity 105) may increase a range of a signal by increasing an output of a PA and performing one or more waveform shaping operations to meet performance targets for the signal (e.g., to mitigate negative effects of increasing PA output). For example, the UE 115 may modulate the signal according to a modulation scheme (e.g., QAM256), which may traditionally be associated with a relatively high MPR, however, the UE 115 may select a decreased MPR to increase the range of the signal. The UE 115 may then perform one or more waveform shaping operations to minimize nonlinear effects of the increased power output of the PA. For example, the UE 115 may push IMD in-band while meeting out-of-band performance metrics. Accordingly, the range of the signal may be increased without negatively impacting one or more performance metrics. In some cases, the signal may be received by a network entity, which may be capable of receiving non-linear signaling. The network entity (e.g., the non-linear receiver) may perform one or more operations to increase an SNR of the signal.

The system 200-a may enable a network device (e.g., a UE 115, a network entity 105) to improve signal quality. For example, the system 200-a may enable the network device to improve signal quality for signaling with high data rates and low MPRs. For example, the system 200-a may improve PAPR, ACLR, and IBE ratio for the signal at higher levels of amplification. A UE 115 may use an input signal generator 210 to generate a waveform (e.g., with an increased power, with an increased range), use an interference canceller 215 and a clipper 220 to reduce a PAPR and increase an IBE ratio of the waveform, and use an ACLR correction component 225 to increase an ACLR of the waveform. That is, the input signal generator 210 may include one or more PAs, which may increase a power of the signal and the waveform shaping stages 205 may improve the signal quality. In some other cases, a power of the signal may be increase using one or more PAs not included in the input signal generator 210. For example, a UE 115 may utilize one or more PAs to amplify an output of the CP component 230. In such cases, the one or more PAs may be coupled with an output of the CP component 230. In some cases, the UE 115 may use a CP component 230 to add a CP to the waveform. As a result of the operations performed during the first waveform shaping stage 205-a and the second waveform shaping stage 205-b, the range of the signal may be increased without negatively impacting PAPR, IBE ratio, and ACLR for the signal.

In some cases, a first waveform shaping stage 205-a, a second waveform shaping stage 205-b, or both, may be performed iteratively (e.g., for a quantity of iterations). For example, the first waveform shaping stage 205-a may include a feedback loop where the waveform output by the clipper 220 is fed back to an input of the interference canceller 215. In some other cases, the feedback loop may not be utilized. For example, an output of the clipper 220 may not be fed back to the input of the interference canceller 215. In some cases, the clipper 220 may perform a compression operation, which may reduce or clip peaks of a waveform. The clipper 220 may be an example of a hard clipper or a soft clipper. In some cases, the system 200-a may include electronic couplings. For example, the input signal generator 210 may be electronically coupled with the interference canceller 215. Similarly, the interference canceller may be electronically coupled with the clipper 220, the clipper 220 may be electronically coupled with the ACLR correction component 225, and the ACLR correction component 225 may be electronically coupled with the CP component 230. In some other cases, the components included in the system 200-a may be wirelessly coupled. The combination of the first waveform shaping stage 205-a and the second waveform shaping stage 205-b may be an example of a multi-stage signal compression technique (MASCOT).

Figure 2B:
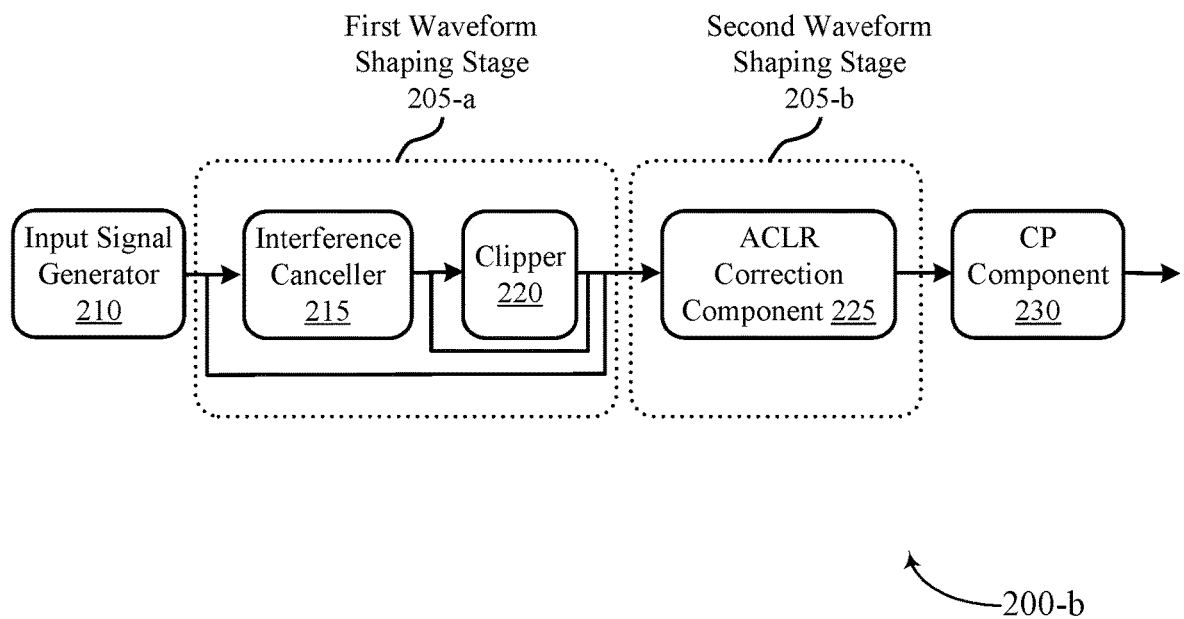

FIG. 2B illustrates an example of a system 200-b that supports improved techniques for waveform compression in accordance with one or more aspects of the present disclosure. The system 200-b may be implemented by aspects of the wireless communications system 100. For example, the system 200-b may be implemented by a UE 115 or a network entity 105, as described with reference to FIG. 1. The system 200-b may include one or more components (e.g., hardware components) installed at a UE 115 or a network entity 105 for processing wireless communications signals. The one or more components may include an input signal generator 210, an interference canceller 215, a clipper 220, an ACLR correction component 225, and a CP component 230, which may be examples of respective components as described with reference to FIG. 2A. These components may be implemented as, for example, a first waveform shaping stage 205-a and a second waveform shaping stage 205-b.

In some cases, the system 200-b may include a feedback loop that enables the clipper 220 to iteratively perform clipping operations on a waveform output by the interference canceller 215. For example, the first waveform shaping stage 205-a may include an electrical coupling between an output of the clipper 220 and an input of the clipper 220. An output of the clipper 220 may be fed back (e.g., via the electrical coupling) to an input of the clipper 220. That is, the clipper 220 may perform (e.g., iteratively) a quantity of clipping operations on an output of the interference canceller 215. In some cases, the feedback loop (e.g., for the clipper 220) may not be utilized. For example, an output of the clipper 220 may not be fed back to the input of the clipper 220.

Iteratively performing a quantity of clipping operations on the waveform output by the interference canceller 215 may reduce a PAPR of the waveform. In some cases, each clipping operation (e.g., each iteration of the clipping operation) may further reduce a PAPR of the waveform when compared to a previous iteration of the clipping operation. In some cases, a network device (e.g., a UE 115 or a network entity 105) may determine a quantity of clipping operations for reducing a PAPR of a waveform such that the PAPR of the waveform is below a threshold PAPR. For example, a network device may activate one or more switching components which may couple an output of the clipper 220 with an input of the clipper 220 for a duration. In some cases, the network device may determine to perform a quantity of clipping operations on an output of the interference canceller 215, which may reduce a PAPR of the output of the interference canceller 215.

Figure 3A:
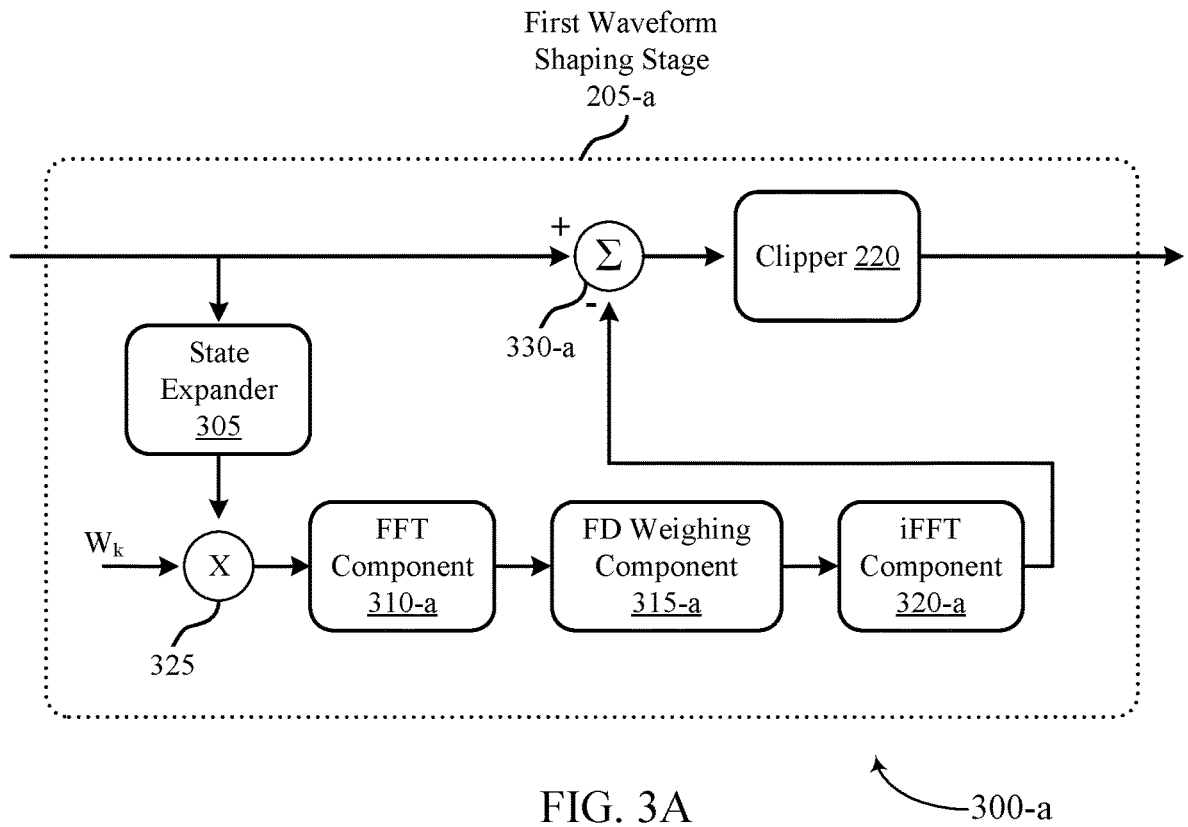
FIGS. 3A and 3B illustrate examples of subsystems that support improved techniques for waveform compression in accordance with one or more aspects of the present disclosure.

FIG. 3A illustrates an example of a subsystem 300-a that supports improved techniques for waveform compression in accordance with one or more aspects of the present disclosure. The subsystem 300-a may be implemented by aspects of the wireless communications system 100. For example, the subsystem 300-a may be implemented by a UE 115 or a network entity 105, as described with reference to FIG. 1. The subsystem 300-a may include one or more components (e.g., hardware components) installed at a UE 115 or a network entity 105 for processing wireless communications signals. For example, the subsystem 300-a may include a state expander 305, an FFT component 310-a, a frequency domain (FD) weighing component 315-a, an iFFT component 320-a, a clipper 220, a multiplier 325, and a summation block 330-a.

As described herein, the first waveform shaping stage 205-a may include a clipper 220 and an interference canceller 215, as described with reference to FIG. 2. In some cases, the interference canceller 215 may include the state expander 305, the multiplier 325, the FFT component 310-a, the FD weighing component 315-a, and the iFFT component 320-a. In some cases, an output of the interference canceller 215 may be received by the summation block 330-a. The summation block 330-a may subtract the output of the interference canceller 215 (e.g., an output of the iFFT component 320-a) from an output of the input signal generator 210 (e.g., a raw waveform).

The interference canceller 215 may serve to increase an IBE ratio of a waveform. For example, the interference canceller 215 may receive an output of the input signal generator 210 and may perform one or more operations to increase the IBE ratio of the output of the input signal generator 210. In some cases, the one or more operations to increase the IBE ratio may include a state expansion operation, an FFT operation, a FD weighing operation, and an iFFT operation. In some cases, the interference canceller 215 may include the multiplier 325. The multiplier 325 may perform one or more operations to combine an output of the state expander 305 with one or more clipper kernels (e.g., Volterra memoryless hard clipper kernels normalized to a linear term).

As described herein, the clipper 220 may perform one or more operations to reduce a PAPR of a waveform. For example, the clipper 220 may perform the one or more operations on an output of the summation block 330-a. The one or more operations may include one or more compression techniques, such as hard clipping or soft clipping. In some cases, a clipper 220 may flatten a portion of a signal that exceeds a threshold, which may reduce a difference between a maximum amplitude of the signal and an average amplitude of the signal. For example, the clipper 220 may reduce a dynamic range for a portion of a signal that exceeds the threshold. The gain may be reduced based on a parameter for compression. In some cases, the clipper 220 may reduce a gain or an amplitude for a portion of the signal based on a compression ratio. In some cases, a clipping level (e.g., a degree of compression) may be determined based on a type of a receiver that receives the output of the CP component 230 (e.g., a signal, a waveform). For example, a UE may select a clipping level for the clipper 220 based on determining that a receiving device, such as a network entity, is a non-linear receiving device or otherwise capable of receiving non-linear transmissions.

In some cases, the subsystem 300-a may include electronic couplings. For example, the state expander 305 may be electronically coupled with the input signal generator 210, the multiplier 325, and the summation block 330-a. Similarly, the FFT component 310-a may be electronically coupled with the multiplier 325 and the FD weighing component 315-a. The iFFT component 320-a may be electronically coupled with the FD weighing component 315-a and the summation block 330-a. Additionally or alternatively, the clipper 220 may be electronically coupled with the summation block 330-a and the ACLR correction component 225.

Figure 3B:
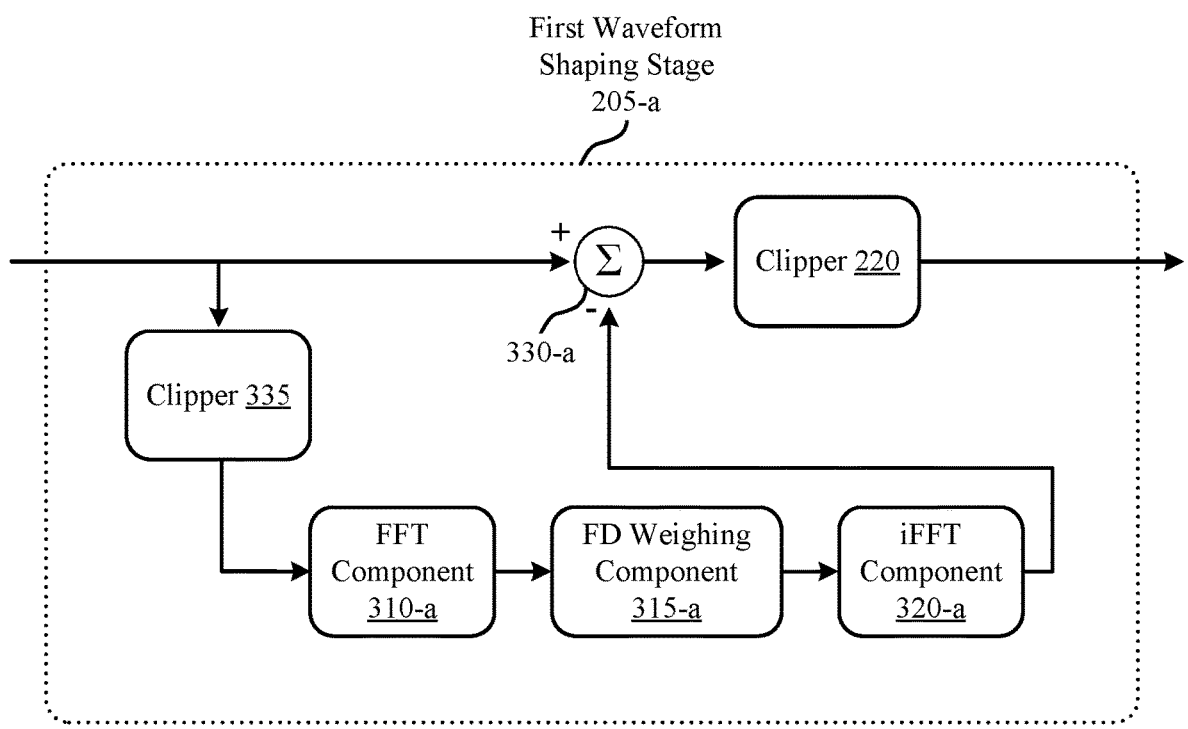

FIG. 3B illustrates an example of a subsystem 300-b that supports improved techniques for waveform compression in accordance with one or more aspects of the present disclosure. The subsystem 300-b may be implemented by aspects of the wireless communications system 100. For example, the subsystem 300-b may be implemented by a UE 115 or a network entity 105, as described with reference to FIG. 1. The subsystem 300-b may include one or more components (e.g., hardware components) installed at a UE 115 or a network entity 105 for processing wireless communications signals. For example, the subsystem 300-b may include an FFT component 310-a, a frequency domain (FD) weighing component 315-a, an iFFT component 320-a, a clipper 220, a multiplier 325, and a summation block 330-a, which may be examples of respective components as described with reference to FIG. 3A. Additionally, or alternatively, the subsystem 300-b may include a clipper 335. For example, the clipper 335 may be implemented as an alternative to the multiplier 325 and the state expander 305.

In some cases, the clipper 335 may reduce a complexity of the subsystem 300-b (e.g., when compared to the subsystem 300-a). The clipper 335 may reduce a PAPR of a waveform output by the input signal generator 210, as described with reference to FIGS. 2A and 2B. That is, the clipper 335 may reduce the PAPR of the waveform output by the input signal generator 210 prior to being transmitted to the FFT component 310-a. In some cases, the clipper 335 may be an example of the clipper 220 (e.g., the clipper 335 may not be different from the clipper 220). In some other cases, the clipper 335 may be different from the clipper 220. The clipper 335 may reduce a PAPR of a waveform prior to being transmitted to the clipper 220, which may save power, processing resources, or both.

Figure 4:
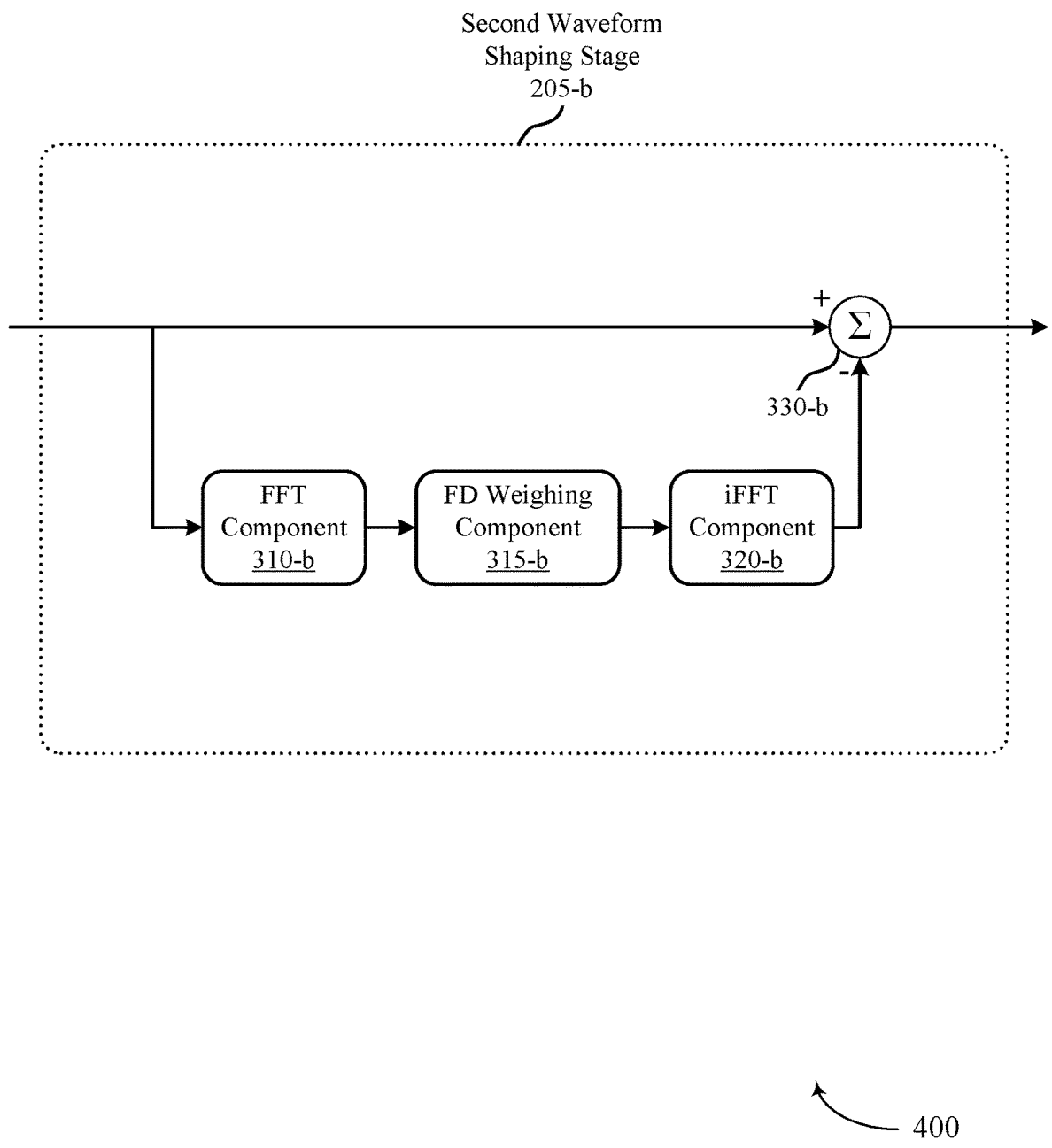
FIG. 4 illustrates an example of a subsystem that supports improved techniques for waveform compression in accordance with one or more aspects of the present disclosure.

FIG. 4 illustrates an example of a subsystem 400 that supports improved techniques for waveform compression in accordance with one or more aspects of the present disclosure. The subsystem 400 may be implemented by aspects of the wireless communications system 100. For example, the subsystem 400 may be implemented by a UE 115 or a network entity 105, as described with reference to FIG. 1. The subsystem 400 may include one or more components (e.g., hardware components) installed at a UE 115 or a network entity 105 for processing wireless communications signals. For example, the subsystem 400 may include an FFT component 310-b, an FD weighing component 315-b, an iFFT component 320-b, and a summation block 330-b.

As described herein, the second waveform shaping stage 205-b may include or implement an ACLR correction component 225, as described with reference to FIG. 2. In such cases, the ACLR correction component 225 may include the FFT component 310-b, the FD weighing component 315-b, and the iFFT component 320-b. In some cases, an output of the ACLR correction component 225 (e.g., an output of the iFFT component 320-b) may be received by the summation block 330-b. The summation block 330-b may combine the output of the ACLR correction component (e.g., an output of the iFFT component 320-b) with an output of the clipper 220. In some other cases, the summation block 330-b may subtract the output of the ACLR correction component 225 from the output of the clipper 220. In some cases, the second waveform shaping stage 205-b may not include the summation block 330-b. For example, an output of the clipper 220 may be transmitted directly to the FFT component 310-b. Additionally, or alternatively, an output of the FFT component 310-b may be transmitted directly to the FD weighing component 315-b, an output of the FD weighing component 315-b may be transmitted directly to the iFFT component 320-b, and an output of the iFFT component 320-b may then be transmitted to the CP component 230 (e.g., without being transmitted to a summation block 330-b). In some cases, one or more components (e.g., of a UE) may receive an output of the second waveform shaping stage and perform up-conversion or other operations using a digital predistortion block (e.g., prior to the output of the second waveform shaping stage being amplified by a PA).

The ACLR correction component 225 may serve to increase an ACLR of a waveform (e.g., based on an ACLR threshold or specification). For example, the ACLR correction component 225 may receive an output of the clipper 220 and may perform one or more operations to increase the ACLR ratio of the output of the clipper 220. That is, the ACLR correction component 225 may reduce adjacent channel leakage. In some cases, the one or more operations to increase the ACLR may include an FFT operation, a FD weighing operation, and an iFFT operation. The FD weighing operation (e.g., performed by the FD weighing component 315-b) may be based on a function including one or more configurable parameters (e.g., the FD weighing operation may be modular). In some cases, the FFT component 310-b and the summation block 330-b may receive the output of the clipper 220.

The one or more operations performed by the ACLR correction component 225 may include one or more compression techniques. In some cases, the subsystem 400 may include electronic couplings, which may be wireless couplings. For example, the FFT component 310-b may be coupled with the FD weighing component 315-b and the clipper 220. Similarly, the iFFT component 320-b may be electronically coupled with the FD weighing component 315-b and the summation block 330-b. In some cases, the summation block 330-b may be electronically coupled with the clipper 220 and the CP component 230.

In some cases, the second waveform shaping stage 205-b may be optional (e.g., the second waveform shaping stage 205-b may be omitted). For example, it may be desirable under some circumstances to reduce a complexity of a system 200, as described with reference to FIG. 2. In such cases, one or more components of a system 200 may be omitted or modified. For example, the system 200-b may include a feedback loop for a clipper 220. Based on including the feedback loop, the system 200-b may be modified to omit the second waveform shaping stage 205-b. Additionally, or alternatively, a subsystem 300-b may include a clipper 335. Based on including the clipper 335, the subsystem 300-b may be modified to omit the second waveform shaping stage 205-b. In some cases, omitting the second waveform shaping stage 205-b may reduce a complexity of a system 200 or a subsystem 300. In some cases, the second waveform shaping stage 205-b may be modified to include a finite impulse response (FIR) filter (not shown) (e.g., instead of the FFT component 310-b, the FD weighing component 315-b, the iFFT component 320-b, and the summation block 330-b).

Figure 5:
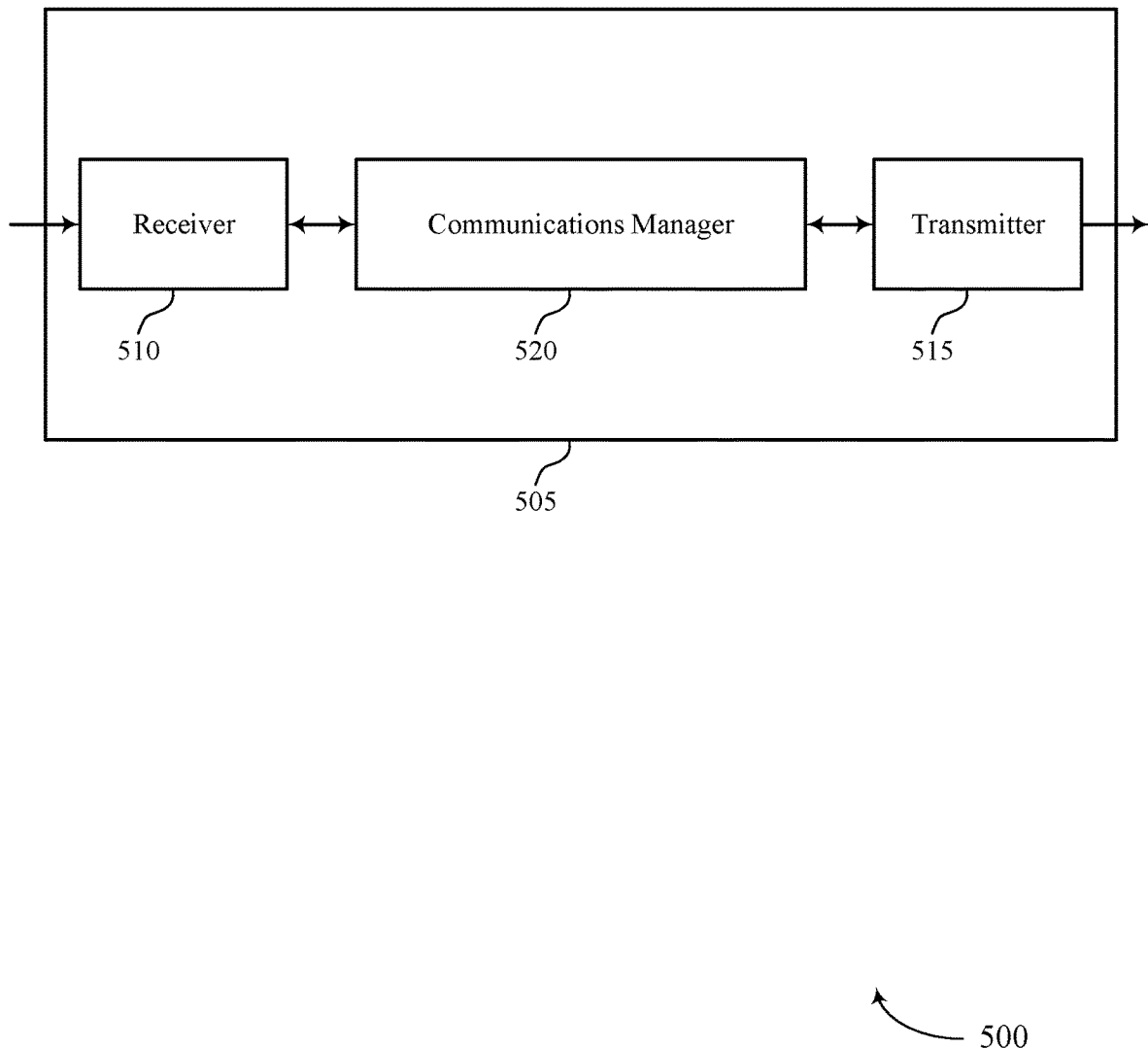
FIGS. 5 and 6 show block diagrams of devices that support improved techniques for waveform compression in accordance with one or more aspects of the present disclosure.

FIG. 5 shows a block diagram 500 of a device 505 that supports improved techniques for waveform compression in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to improved techniques for waveform compression). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to improved techniques for waveform compression). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of improved techniques for waveform compression as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for generating an input signal including information for transmission over a wireless channel. The communications manager 520 may be configured as or otherwise support a means for performing a first waveform shaping stage of a multistage waveform shaping process on the input signal, where performing the first waveform shaping stage includes increasing an in-band emissions ratio of the input signal and reducing a peak-to-average-power ratio (PAPR) of the input signal. The communications manager 520 may be configured as or otherwise support a means for performing a second waveform shaping stage of the multistage waveform shaping process on an output of the first waveform shaping stage, where performing the second waveform shaping stage includes reducing an adjacent channel leakage ratio of the output of the first waveform shaping stage. The communications manager 520 may be configured as or otherwise support a means for transmitting a signal over the wireless channel, where the signal is based on an output of the second waveform shaping stage.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for increasing PAE. For example, the device 505 may support techniques for improving signaling quality, which may enable the device 505 to reduce power consumption of the device. Additionally or alternatively, the device 505 may support techniques for improving signal quality associated with high data rate communications. Accordingly, communication resources may be utilized more efficiently. For example, the device 505 may perform waveform shaping operations to reduce PAPR, increase IBE, and increase ACLR, which may improve signal quality.

Figure 6:
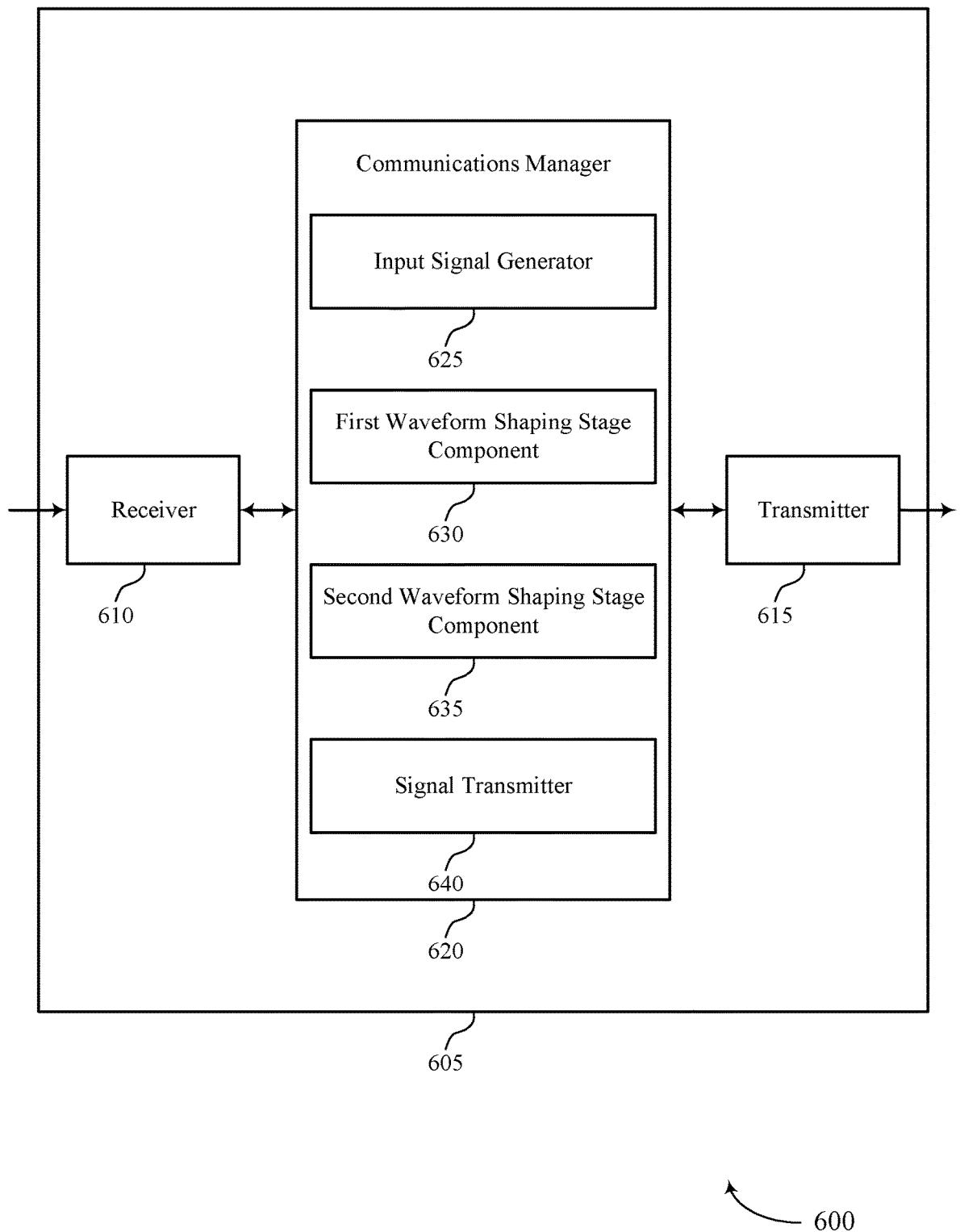

FIG. 6 shows a block diagram 600 of a device 605 that supports improved techniques for waveform compression in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to improved techniques for waveform compression). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to improved techniques for waveform compression). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of improved techniques for waveform compression as described herein. For example, the communications manager 620 may include an input signal generator 625, a first waveform shaping stage component 630, a second waveform shaping stage component 635, a signal transmitter 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The input signal generator 625 may be configured as or otherwise support a means for generating an input signal including information for transmission over a wireless channel. The first waveform shaping stage component 630 may be configured as or otherwise support a means for performing a first waveform shaping stage of a multistage waveform shaping process on the input signal, where performing the first waveform shaping stage includes increasing an in-band emissions ratio of the input signal and reducing a peak-to-average-power ratio (PAPR) of the input signal. The second waveform shaping stage component 635 may be configured as or otherwise support a means for performing a second waveform shaping stage of the multistage waveform shaping process on an output of the first waveform shaping stage, where performing the second waveform shaping stage includes reducing an adjacent channel leakage ratio of the output of the first waveform shaping stage. The signal transmitter 640 may be configured as or otherwise support a means for transmitting a signal over the wireless channel, where the signal is based on an output of the second waveform shaping stage.

Figure 7:
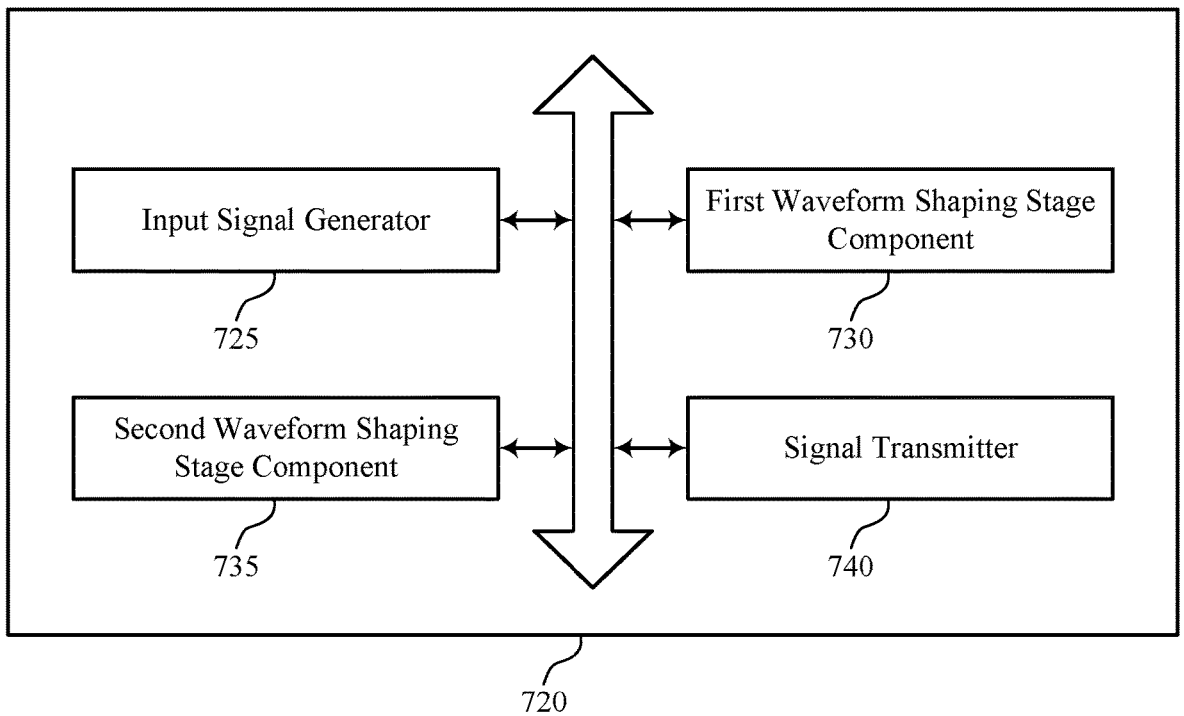
FIG. 7 shows a block diagram of a communications manager that supports improved techniques for waveform compression in accordance with one or more aspects of the present disclosure.

FIG. 7 shows a block diagram 700 of a communications manager 720 that supports improved techniques for waveform compression in accordance with one or more aspects of the present disclosure. The communications manager 720 may be an example of aspects of a communications manager 520, a communications manager 620, or both, as described herein. The communications manager 720, or various components thereof, may be an example of means for performing various aspects of improved techniques for waveform compression as described herein. For example, the communications manager 720 may include an input signal generator 725, a first waveform shaping stage component 730, a second waveform shaping stage component 735, a signal transmitter 740, or any combination thereof. Each of these components may communicate, directly or indirectly, with one another (e.g., via one or more buses).

The communications manager 720 may support wireless communications at a UE in accordance with examples as disclosed herein. The input signal generator 725 may be configured as or otherwise support a means for generating an input signal including information for transmission over a wireless channel. The first waveform shaping stage component 730 may be configured as or otherwise support a means for performing a first waveform shaping stage of a multistage waveform shaping process on the input signal, where performing the first waveform shaping stage includes increasing an in-band emissions ratio of the input signal and reducing a peak-to-average-power ratio (PAPR) of the input signal. The second waveform shaping stage component 735 may be configured as or otherwise support a means for performing a second waveform shaping stage of the multistage waveform shaping process on an output of the first waveform shaping stage, where performing the second waveform shaping stage includes reducing an adjacent channel leakage ratio of the output of the first waveform shaping stage. The signal transmitter 740 may be configured as or otherwise support a means for transmitting a signal over the wireless channel, where the signal is based on an output of the second waveform shaping stage.

In some examples, to support performing the first waveform shaping stage of the multistage waveform shaping process, the first waveform shaping stage component 730 may be configured as or otherwise support a means for performing an interference cancellation operation to increase the in-band emissions ratio of the input signal.

In some examples, to support performing the interference cancellation operation, the first waveform shaping stage component 730 may be configured as or otherwise support a means for performing a state expansion of nonlinear components of the input signal. In some examples, to support performing the interference cancellation operation, the first waveform shaping stage component 730 may be configured as or otherwise support a means for performing frequency selective filtering on an output of the state expansion.

In some examples, to support performing the first waveform shaping stage of the multistage waveform shaping process, the first waveform shaping stage component 730 may be configured as or otherwise support a means for performing a clipping operation after increasing the in-band emissions ratio of the input signal to reduce the PAPR of the input signal.

In some examples, to support performing the second stage of the multistage waveform shaping process, the second waveform shaping stage component 735 may be configured as or otherwise support a means for performing frequency selective filtering on the output of the first waveform shaping stage to reduce the adjacent channel leakage ratio of the output of the first waveform shaping stage.

In some examples, an in-band emissions ratio of the output of the second waveform shaping stage is greater than an in-band emissions ratio of the input signal.

In some examples, an adjacent channel leakage ratio of the output of the second waveform shaping stage is greater than an adjacent channel leakage ratio of the input signal.

In some examples, to support performing the first waveform shaping stage, the first waveform shaping stage component 730 may be configured as or otherwise support a means for introducing intermodulation distortion to the output of the first waveform shaping stage for processing at a receiver.

In some examples, to support performing the first waveform shaping stage, the first waveform shaping stage component 730 may be configured as or otherwise support a means for reducing an adjacent channel leakage ratio of the input signal.

In some examples, to support performing the first waveform shaping stage, the first waveform shaping stage component 730 may be configured as or otherwise support a means for performing a quantity of iterations of the first waveform shaping stage, where the output of the first waveform shaping stage includes an output of a final iteration of the quantity of iterations of the first waveform shaping stage.

Figure 8:
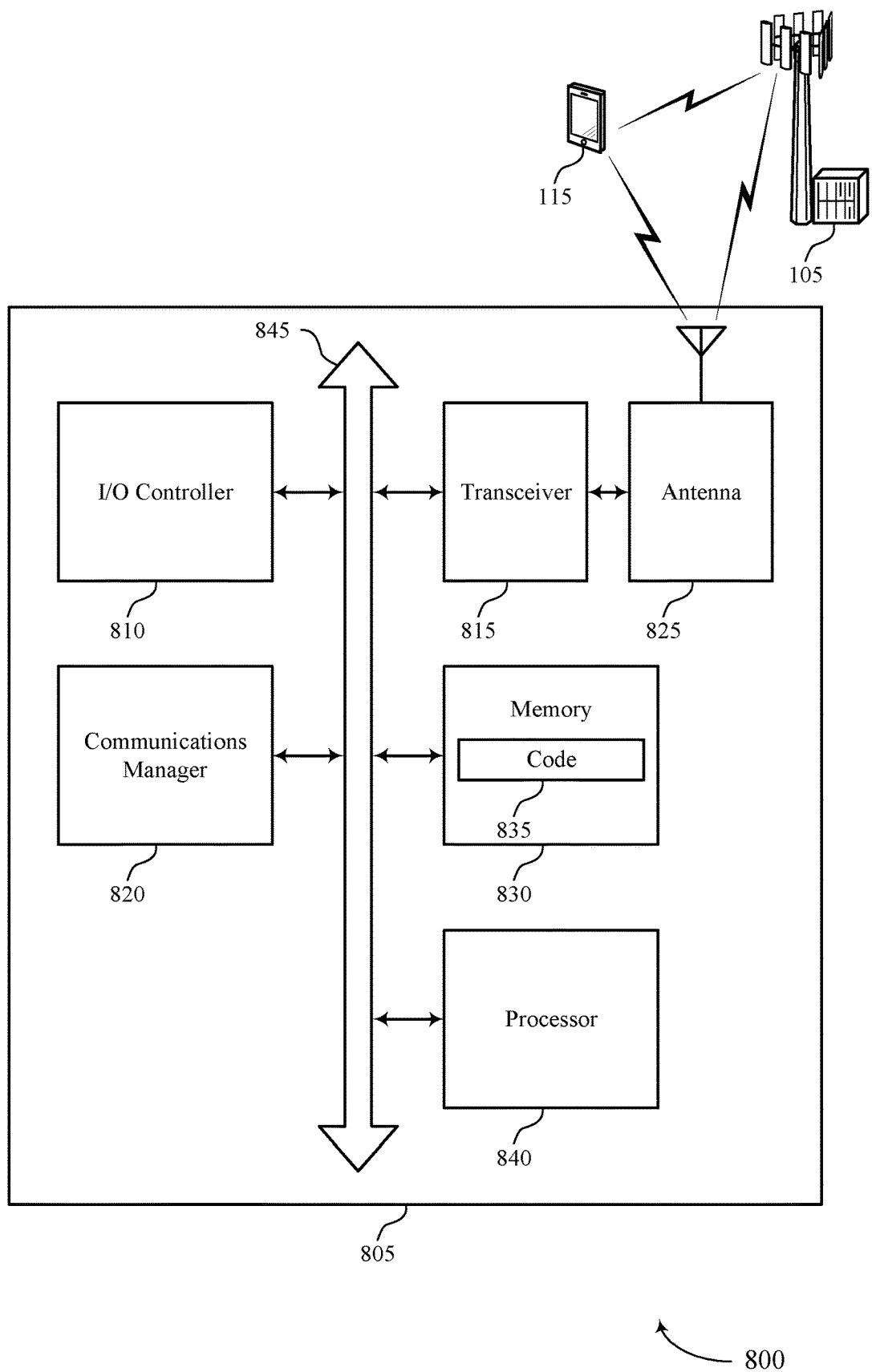
FIG. 8 shows a diagram of a system including a device that supports improved techniques for waveform compression in accordance with one or more aspects of the present disclosure.

FIG. 8 shows a diagram of a system 800 including a device 805 that supports improved techniques for waveform compression in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting improved techniques for waveform compression). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for generating an input signal including information for transmission over a wireless channel. The communications manager 820 may be configured as or otherwise support a means for performing a first waveform shaping stage of a multistage waveform shaping process on the input signal, where performing the first waveform shaping stage includes increasing an in-band emissions ratio of the input signal and reducing a peak-to-average-power ratio (PAPR) of the input signal. The communications manager 820 may be configured as or otherwise support a means for performing a second waveform shaping stage of the multistage waveform shaping process on an output of the first waveform shaping stage, where performing the second waveform shaping stage includes reducing an adjacent channel leakage ratio of the output of the first waveform shaping stage. The communications manager 820 may be configured as or otherwise support a means for transmitting a signal over the wireless channel, where the signal is based on an output of the second waveform shaping stage.

By including or configuring the communications manager 820 in accordance with examples as described herein, the device 805 may support techniques for increasing a range of wireless communications. For example, the device 805 may perform waveform shaping operations, which may enable the device 805 to increase an output of a PA. In some cases, the waveform shaping operations may additionally enable the device 805 to improve PAE, which may reduce power consumption at the device 805. For example, the device 805 may perform waveform shaping operations to reduce PAPR, increase IBE, and increase ACLR, which may improve signal quality.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of improved techniques for waveform compression as described herein, or the processor 840 and the memory 830 may be otherwise configured to perform or support such operations.

Figure 9:
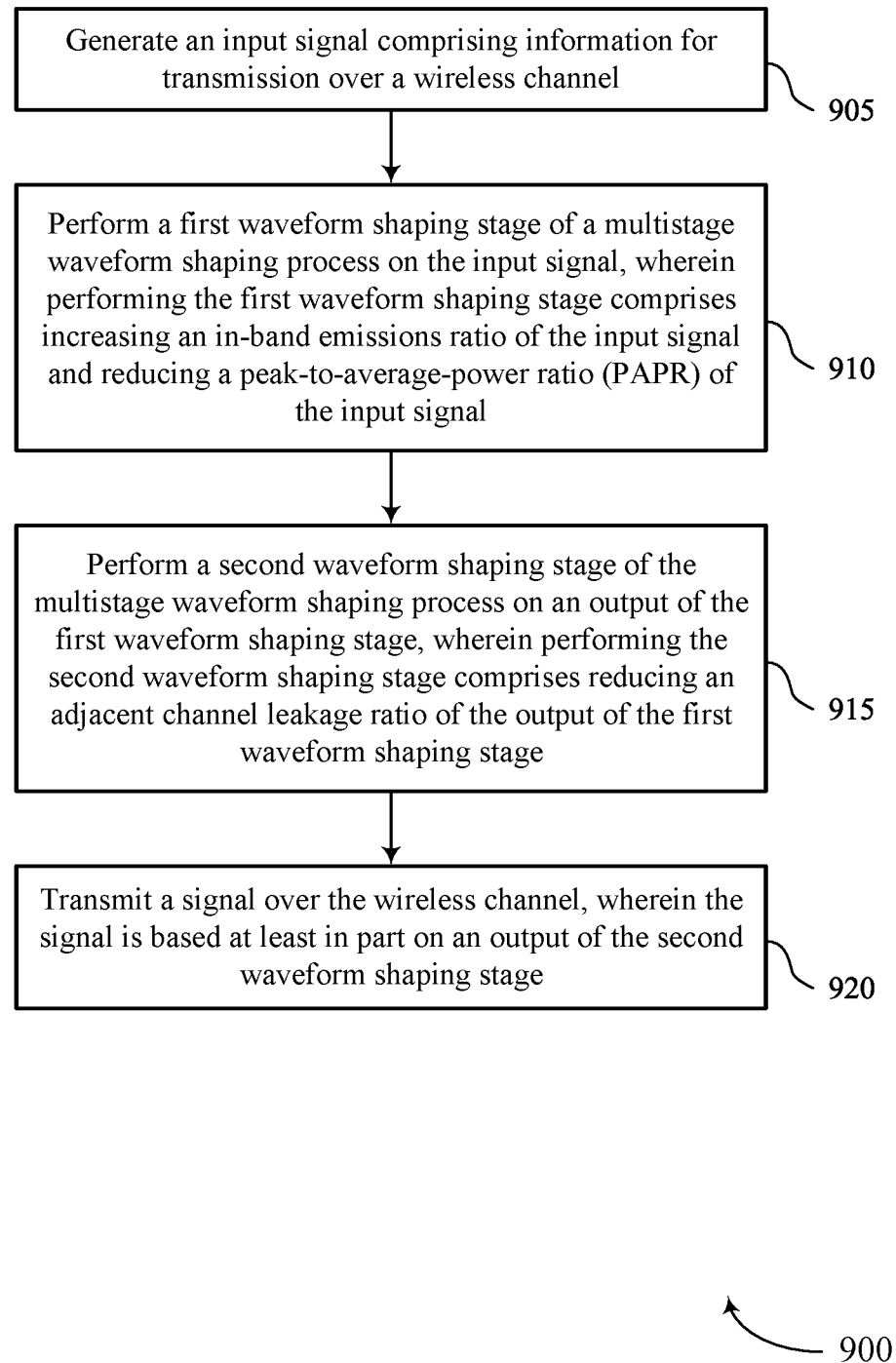
FIGS. 9 and 10 show flowcharts illustrating methods that support improved techniques for waveform compression in accordance with one or more aspects of the present disclosure.

FIG. 9 shows a flowchart illustrating a method 900 that supports improved techniques for waveform compression in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include generating an input signal including information for transmission over a wireless channel. The operations of 905 may be performed in accordance with examples as disclosed herein. In some examples, aspects of the operations of 905 may be performed by an input signal generator 725 as described with reference to FIG. 7.

At 910, the method may include performing a first waveform shaping stage of a multistage waveform shaping process on the input signal, where performing the first waveform shaping stage includes increasing an in-band emissions ratio of the input signal and reducing a peak-to-average-power ratio (PAPR) of the input signal. The operations of 910 may be performed in accordance with examples as disclosed herein. In some examples, aspects of the operations of 910 may be performed by a first waveform shaping stage component 730 as described with reference to FIG. 7.

At 915, the method may include performing a second waveform shaping stage of the multistage waveform shaping process on an output of the first waveform shaping stage, where performing the second waveform shaping stage includes reducing an adjacent channel leakage ratio of the output of the first waveform shaping stage. The operations of 915 may be performed in accordance with examples as disclosed herein. In some examples, aspects of the operations of 915 may be performed by a second waveform shaping stage component 735 as described with reference to FIG. 7.

At 920, the method may include transmitting a signal over the wireless channel, where the signal is based on an output of the second waveform shaping stage. The operations of 920 may be performed in accordance with examples as disclosed herein. In some examples, aspects of the operations of 920 may be performed by a signal transmitter 740 as described with reference to FIG. 7.

Figure 10:
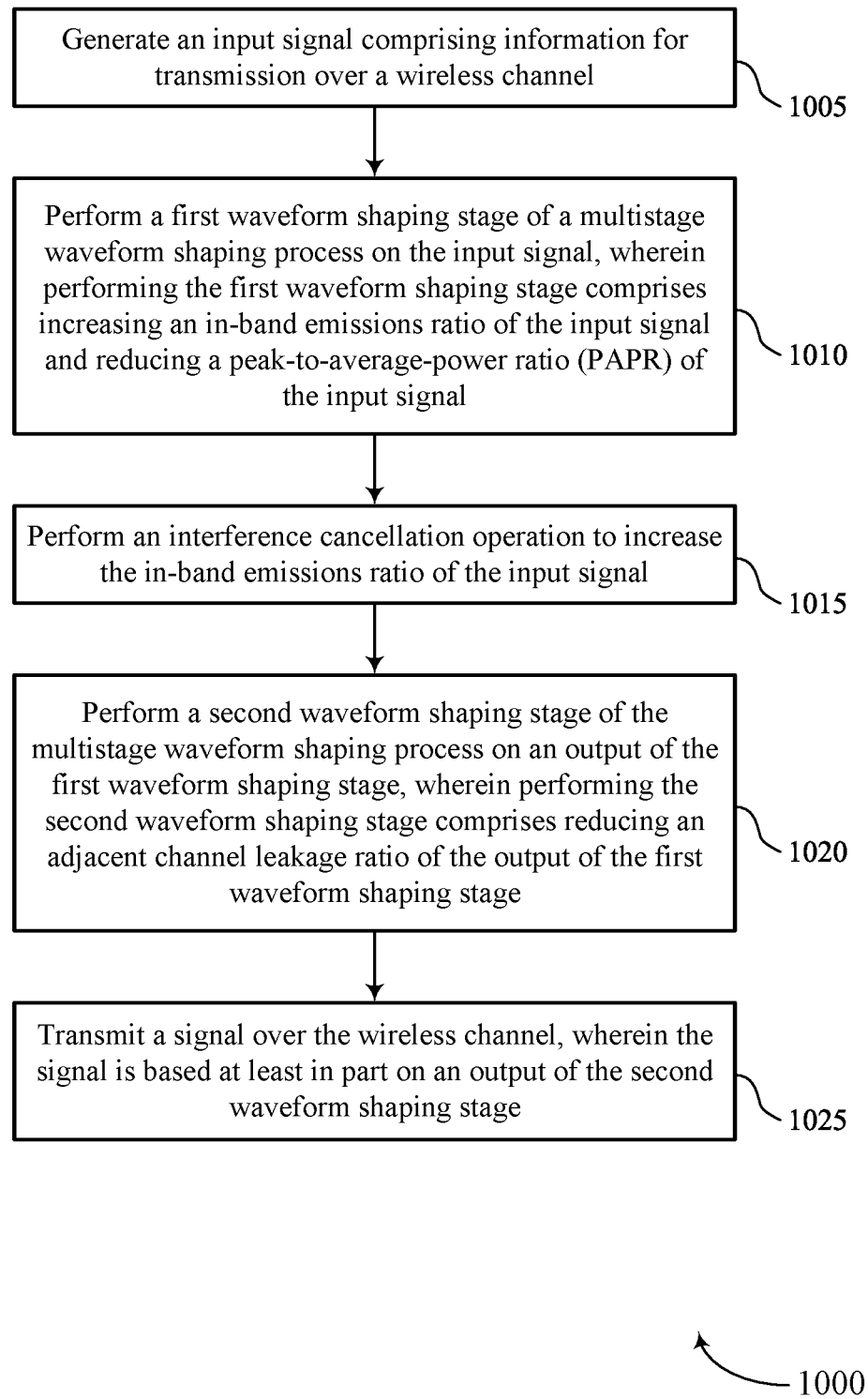

FIG. 10 shows a flowchart illustrating a method 1000 that supports improved techniques for waveform compression in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include generating an input signal including information for transmission over a wireless channel. The operations of 1005 may be performed in accordance with examples as disclosed herein. In some examples, aspects of the operations of 1005 may be performed by an input signal generator 725 as described with reference to FIG. 7.

At 1010, the method may include performing a first waveform shaping stage of a multistage waveform shaping process on the input signal, where performing the first waveform shaping stage includes increasing an in-band emissions ratio of the input signal and reducing a peak-to-average-power ratio (PAPR) of the input signal. The operations of 1010 may be performed in accordance with examples as disclosed herein. In some examples, aspects of the operations of 1010 may be performed by a first waveform shaping stage component 730 as described with reference to FIG. 7.

At 1015, the method may include performing an interference cancellation operation to increase the in-band emissions ratio of the input signal. The operations of 1015 may be performed in accordance with examples as disclosed herein. In some examples, aspects of the operations of 1015 may be performed by a first waveform shaping stage component 730 as described with reference to FIG. 7.

At 1020, the method may include performing a second waveform shaping stage of the multistage waveform shaping process on an output of the first waveform shaping stage, where performing the second waveform shaping stage includes reducing an adjacent channel leakage ratio of the output of the first waveform shaping stage. The operations of 1020 may be performed in accordance with examples as disclosed herein. In some examples, aspects of the operations of 1020 may be performed by a second waveform shaping stage component 735 as described with reference to FIG. 7.

At 1025, the method may include transmitting a signal over the wireless channel, where the signal is based on an output of the second waveform shaping stage. The operations of 1025 may be performed in accordance with examples as disclosed herein. In some examples, aspects of the operations of 1025 may be performed by a signal transmitter 740 as described with reference to FIG. 7.

The following provides an overview of aspects of the present disclosure:

Aspect 1: A method for wireless communications at a UE, comprising: generating an input signal comprising information for transmission over a wireless channel; performing a first waveform shaping stage of a multistage waveform shaping process on the input signal, wherein performing the first waveform shaping stage comprises increasing an in-band emissions ratio of the input signal and reducing a peak-to-average-power ratio (PAPR) of the input signal; performing a second waveform shaping stage of the multistage waveform shaping process on an output of the first waveform shaping stage, wherein performing the second waveform shaping stage comprises reducing an adjacent channel leakage ratio of the output of the first waveform shaping stage; and transmitting a signal over the wireless channel, wherein the signal is based at least in part on an output of the second waveform shaping stage.

Aspect 2: The method of aspect 1, wherein performing the first waveform shaping stage of the multistage waveform shaping process further comprises: performing an interference cancellation operation to increase the in-band emissions ratio of the input signal.

Aspect 3: The method of aspect 2, wherein performing the interference cancellation operation further comprises: performing a state expansion of nonlinear components of the input signal; and performing frequency selective filtering on an output of the state expansion.

Aspect 4: The method of any of aspects 2 through 3, wherein performing the interference cancellation operation further comprises: performing a clipping operation on the input signal; and performing frequency selective filtering on an output of the clipping operation.

Aspect 5: The method of any of aspects 1 through 4, wherein performing the first waveform shaping stage of the multistage waveform shaping process further comprises: performing a clipping operation after increasing the in-band emissions ratio of the input signal to reduce the PAPR of the input signal.

Aspect 6: The method of aspect 5, wherein performing the clipping operation further comprises: performing a quantity of iterations of the clipping operation, wherein the output of the first waveform shaping stage comprises an output of a final iteration of the quantity of iterations of the clipping operation.

Aspect 7: The method of any of aspects 1 through 6, wherein performing the second waveform shaping stage of the multistage waveform shaping process further comprises: performing frequency selective filtering on the output of the first waveform shaping stage to reduce the adjacent channel leakage ratio of the output of the first waveform shaping stage.

Aspect 8: The method of any of aspects 1 through 7, wherein an in-band emissions ratio of the output of the second waveform shaping stage is greater than the in-band emissions ratio of the input signal.

Aspect 9: The method of any of aspects 1 through 8, wherein an adjacent channel leakage ratio of the output of the second waveform shaping stage is greater than an adjacent channel leakage ratio of the input signal.

Aspect 10: The method of any of aspects 1 through 9, wherein performing the first waveform shaping stage further comprises: introducing intermodulation distortion to the output of the first waveform shaping stage for processing at a receiver.

Aspect 11: The method of any of aspects 1 through 10, wherein performing the first waveform shaping stage further comprises: reducing an adjacent channel leakage ratio of the input signal.

Aspect 12: The method of any of aspects 1 through 11, wherein performing the first waveform shaping stage further comprises: performing a quantity of iterations of the first waveform shaping stage, wherein the output of the first waveform shaping stage comprises an output of a final iteration of the quantity of iterations of the first waveform shaping stage.

Aspect 13: An apparatus for wireless communications at a UE, comprising a processor; memory coupled with the processor; and instructions stored in the memory and executable by the processor to cause the apparatus to perform a method of any of aspects 1 through 12.

Aspect 14: An apparatus for wireless communications at a UE, comprising at least one means for performing a method of any of aspects 1 through 12.

Aspect 15: A non-transitory computer-readable medium storing code for wireless communications at a UE, the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   generating an input signal comprising information for transmission over a wireless channel;
   performing a first waveform shaping stage of a multistage waveform shaping process on the input signal, wherein performing the first waveform shaping stage comprises a first operation that increases an in-band emissions ratio of the input signal and a second operation, performed after the first operation, that reduces a peak-to-average-power ratio (PAPR) of the input signal;
   performing a second waveform shaping stage of the multistage waveform shaping process on an output of the first waveform shaping stage, wherein performing the second waveform shaping stage comprises reducing an adjacent channel leakage ratio of the output of the first waveform shaping stage after increasing the in-band emissions ratio of the input signal and reducing the PAPR of the input signal; and
   transmitting a signal over the wireless channel, wherein the signal is based at least in part on an output of the second waveform shaping stage.

2. The method of claim 1, wherein performing the first operation of the first waveform shaping stage of the multistage waveform shaping process further comprises:
   performing an interference cancellation operation to increase the in-band emissions ratio of the input signal.

3. The method of claim 2, wherein performing the interference cancellation operation further comprises:
   performing a state expansion of nonlinear components of the input signal; and
   performing frequency selective filtering on an output of the state expansion.

4. The method of claim 2, wherein performing the interference cancellation operation further comprises:
   performing a clipping operation on the input signal; and
   performing frequency selective filtering on an output of the clipping operation.

5. The method of claim 1, wherein performing the second operation of the first waveform shaping stage of the multistage waveform shaping process further comprises:
   performing a clipping operation after increasing the in-band emissions ratio of the input signal to reduce the PAPR of the input signal.

6. The method of claim 5, wherein performing the clipping operation further comprises:
   performing a quantity of iterations of the clipping operation, wherein the output of the first waveform shaping stage comprises an output of a final iteration of the quantity of iterations of the clipping operation.

7. The method of claim 1, wherein performing the second waveform shaping stage of the multistage waveform shaping process further comprises:
   performing frequency selective filtering on the output of the first waveform shaping stage to reduce the adjacent channel leakage ratio of the output of the first waveform shaping stage.

8. The method of claim 1, wherein an in-band emissions ratio of the output of the second waveform shaping stage is greater than the in-band emissions ratio of the input signal.

9. The method of claim 1, wherein an adjacent channel leakage ratio of the output of the second waveform shaping stage is greater than an adjacent channel leakage ratio of the input signal.

10. The method of claim 1, wherein performing the first waveform shaping stage further comprises:
    introducing intermodulation distortion to the output of the first waveform shaping stage for processing at a receiver.

11. The method of claim 1, wherein performing the first waveform shaping stage further comprises:
    reducing an adjacent channel leakage ratio of the input signal.

12. The method of claim 1, wherein performing the first waveform shaping stage further comprises:
    performing a quantity of iterations of the first waveform shaping stage, wherein the output of the first waveform shaping stage comprises an output of a final iteration of the quantity of iterations of the first waveform shaping stage.

13. An user equipment (UE) for wireless communications, comprising:
    one or more memories storing processor-executable code; and
    one or more processors coupled with the one or more memories and operable to execute the code to cause the UE to:
       generate an input signal comprising information for transmission over a wireless channel;
       perform a first waveform shaping stage of a multistage waveform shaping process on the input signal, wherein performing the first waveform shaping stage comprises a first operation that increases an in-band emissions ratio of the input signal and a second operation, performed after the first operation, that reduces a peak-to-average-power ratio (PAPR) of the input signal;

perform a second waveform shaping stage of the multistage waveform shaping process on an output of the first waveform shaping stage, wherein performing the second waveform shaping stage comprises reducing an adjacent channel leakage ratio of the output of the first waveform shaping stage after increasing the in-band emissions ratio of the input signal and reducing the PAPR of the input signal; and transmit a signal over the wireless channel, wherein the signal is based at least in part on an output of the second waveform shaping stage.

14. The UE of claim 13, wherein, to perform the first operation of the first waveform shaping stage of the multistage waveform shaping process, the one or more processors are further operable to execute the code to cause the UE to:
perform an interference cancellation operation to increase the in-band emissions ratio of the input signal.

15. The UE of claim 14, wherein, to perform the interference cancellation operation, the one or more processors are further operable to execute the code to cause the UE to:
perform a state expansion of nonlinear components of the input signal; and
perform frequency selective filtering on an output of the state expansion.

16. The UE of claim 14, wherein, to perform the interference cancellation operation, the one or more processors are further operable to execute the code to cause the UE to:
perform a clipping operation on the input signal; and
perform frequency selective filtering on an output of the clipping operation.

17. The UE of claim 13, wherein, to perform the second operation of the first waveform shaping stage of the multistage waveform shaping process, the one or more processors are further operable to execute the code to cause the UE to:
perform a clipping operation after increasing the in-band emissions ratio of the input signal to reduce the PAPR of the input signal.

18. The UE of claim 17, wherein, to perform the clipping operation, the one or more processors are further operable to execute the code to cause the UE to:
perform a quantity of iterations of the clipping operation, wherein the output of the first waveform shaping stage comprises an output of a final iteration of the quantity of iterations of the clipping operation.

19. The UE of claim 13, wherein to perform the second waveform shaping stage of the multistage waveform shaping process, the one or more processors are further operable to execute the code to cause the UE to:
perform frequency selective filtering on the output of the first waveform shaping stage to reduce the adjacent channel leakage ratio of the output of the first waveform shaping stage.

20. The UE of claim 13, wherein an in-band emissions ratio of the output of the second waveform shaping stage is greater than the in-band emissions ratio of the input signal.

21. The UE of claim 13, wherein an adjacent channel leakage ratio of the output of the second waveform shaping stage is greater than an adjacent channel leakage ratio of the input signal.

22. The UE of claim 13, wherein to perform the first waveform shaping stage, the one or more processors are further operable to execute the code to cause the UE to:
introduce intermodulation distortion to the output of the first waveform shaping stage for processing at a receiver.

23. The UE of claim 13, wherein to perform the first waveform shaping stage, the one or more processors are further operable to execute the code to cause the UE to:
reduce an adjacent channel leakage ratio of the input signal.

24. The UE of claim 13, wherein to perform the first waveform shaping stage, the one or more processors are further operable to execute the code to cause the UE to:
perform a quantity of iterations of the first waveform shaping stage, wherein the output of the first waveform shaping stage comprises an output of a final iteration of the quantity of iterations of the first waveform shaping stage.

25. A non-transitory computer-readable medium storing code for wireless communication at a user equipment (UE), the code comprising instructions executable to:
generate an input signal comprising information for transmission over a wireless channel;
perform a first waveform shaping stage of a multistage waveform shaping process on the input signal, wherein performing the first waveform shaping stage comprises a first operation that increases an in-band emissions ratio of the input signal and a second operation, performed after the first operation, that reduces a peak-to-average-power ratio (PAPR) of the input signal;
perform a second waveform shaping stage of the multistage waveform shaping process on an output of the first waveform shaping stage, wherein performing the second waveform shaping stage comprises reducing an adjacent channel leakage ratio of the output of the first waveform shaping stage after increasing the in-band emissions ratio of the input signal and reducing the PAPR of the input signal; and
transmit a signal over the wireless channel, wherein the signal is based at least in part on an output of the second waveform shaping stage.

26. The non-transitory computer-readable medium of claim 25, wherein the instructions to perform the first operation of the first waveform shaping stage of the multistage waveform shaping process are further executable to:
perform an interference cancellation operation to increase the in-band emissions ratio of the input signal.

27. The non-transitory computer-readable medium of claim 26, wherein the instructions to perform the interference cancellation operation are further executable to:
perform a state expansion of nonlinear components of the input signal; and
perform frequency selective filtering on an output of the state expansion.

28. The non-transitory computer-readable medium of claim 26, wherein the instructions to perform the interference cancellation operation are further executable to:
perform a clipping operation on the input signal; and
perform frequency selective filtering on an output of the clipping operation.

29. The non-transitory computer-readable medium of claim 25, wherein the instructions to perform the second operation of the first waveform shaping stage of the multistage waveform shaping process are further executable to:
perform a clipping operation after increasing the in-band emissions ratio of the input signal to reduce the PAPR of the input signal.

30. The non-transitory computer-readable medium of claim 29, wherein the instructions to perform the clipping operation are further executable to:
   perform a quantity of iterations of the clipping operation, wherein the output of the first waveform shaping stage comprises an output of a final iteration of the quantity of iterations of the clipping operation.

* * * * *